(12) United States Patent
Howett et al.

(10) Patent No.: US 11,057,482 B2
(45) Date of Patent: Jul. 6, 2021

(54) USER INTERFACE MODIFICATION AND USAGE TRACKING

(71) Applicant: Apptimize, LLC, San Francisco, CA (US)

(72) Inventors: Dustin Howett, Menlo Park, CA (US); James Koppel, Cambridge, MA (US); Jeremy Orlow, Menlo Park, CA (US); Nancy Hua, Menlo Park, CA (US)

(73) Assignee: Apptimize, LLC, San Francisco, CA (US)

( * ) Notice: Subject to any disclaimer, the term of this patent is extended or adjusted under 35 U.S.C. 154(b) by 0 days.

(21) Appl. No.: 16/381,590

(22) Filed: Apr. 11, 2019

(65) Prior Publication Data

US 2019/0238647 A1    Aug. 1, 2019

Related U.S. Application Data

(63) Continuation of application No. 14/506,990, filed on Oct. 6, 2014, now Pat. No. 10,291,729.
(Continued)

(51) Int. Cl.
*G06F 8/38* (2018.01)
*H04L 29/08* (2006.01)
(Continued)

(52) U.S. Cl.
CPC .............. *H04L 67/22* (2013.01); *G06F 8/38* (2013.01); *G06F 9/451* (2018.02); *H04L 67/34* (2013.01); *H04L 67/42* (2013.01)

(58) Field of Classification Search
CPC .......... G06F 3/01; G06F 3/048; G06F 3/0481; G06F 3/0484; G06F 11/34; G06F 8/38;
(Continued)

(56) References Cited

U.S. PATENT DOCUMENTS 8,065,600 B2 * 11/2011 Chory ................... G06F 16/954
715/205
10,732,782 B1 * 8/2020 Krivopaltsev ........ G06F 3/0481
(Continued)

OTHER PUBLICATIONS

BoltClock, "Revision—Stack Overflow," https://stackoverflow.com/revisions/8426901/2, 1 page, Dec. 8, 2011.
(Continued)

*Primary Examiner* — Dino Kujundzic
(74) *Attorney, Agent, or Firm* — Fenwick & West LLP

(57) ABSTRACT

Techniques are provided to facilitate tracking events associated with a user interface display of an application at runtime. In at least one implementation, one or more information structures that associate an event tracking indicator with a view selector are stored, wherein the event tracking indicator indicates an event to be tracked, and the view selector indicates one or more constraints to be matched to select a view of the application. During execution of the application, the view selector is evaluated with views used by the application to determine whether each of the one or more constraints of the view selector matches properties of the views. In response to determining that each of the one or more constraints of the view selector matches the properties of at least one of the views, an occurrence of the event indicated by the event tracking indicator associated with the view selector is tracked.

20 Claims, 35 Drawing Sheets (Track)

Related U.S. Application Data

(60) Provisional application No. 61/929,939, filed on Jan. 21, 2014.

(51) Int. Cl.
*H04L 29/06* (2006.01)
*G06F 9/451* (2018.01)

(58) Field of Classification Search
CPC ......... G06F 9/451; H04L 67/22; H04L 67/34; H04L 67/42
See application file for complete search history.

(56) References Cited

U.S. PATENT DOCUMENTS

| | | |
|---|---|---|
| 2004/0183838 A1 | 9/2004 | Lahiri |
| 2006/0284878 A1 | 12/2006 | Zimmer |
| 2006/0294199 A1 | 12/2006 | Bertholf |
| 2010/0287566 A1 | 11/2010 | Hauser |
| 2011/0264996 A1 | 10/2011 | Norris, III |
| 2012/0227000 A1 | 9/2012 | McCoy et al. |
| 2013/0019182 A1 | 1/2013 | Gil et al. |
| 2013/0212487 A1 | 8/2013 | Cote |
| 2013/0219307 A1 | 8/2013 | Raber et al. |
| 2014/0282218 A1 | 9/2014 | Kaufman et al. |
| 2015/0160931 A1 | 6/2015 | Glazer et al. |
| 2015/0161088 A1* | 6/2015 | Kamada ............... G06F 40/154 715/235 |

OTHER PUBLICATIONS

W3schools, "CSS Selector Reference," https://www.w3schools.com/cssref/css_selectors.asp, 9 pages, Jan. 1, 2014.

European Patent Office, Extended European Search Report and Opinion, EP Patent Application No. 20162248.7, dated Jun. 25, 2020, nine pages.

Leiva, L., "ACE: An Adaptive CSS Engine for Web Pages and Web-based Applications," WWW2012 Developer Track, Apr. 2012, pp. 1-4.

Leiva, L., "Interaction-based user interface redesign," Proceedings of the 2012 ACM International Conference on Intelligent User Interfaces, Feb. 2012, pp. 311-312.

W3C, "Selectors API Level 1," Feb. 21, 2013, eight pages, [Online] [Retrieved on Jun. 12, 2020] Retrieved on the Internet <URL: https://www.w3.org/TR/selectors-api/>.

Extended European Search Report, European Application No. 15739969.2, dated Aug. 30, 2017, 12 pages.

PCT International Search Report and Written Opinion, PCT Application No. PCT/US15/11986, dated Apr. 9, 2015, 9 pages.

United States Office Action, U.S. Appl. No. 14/506,990, dated Jan. 12, 2017, 24 pages.

United States Office Action, U.S. Appl. No. 14/506,990, dated Nov. 16, 2017, 22 pages.

United States Office Action, U.S. Appl. No. 14/506,990, dated Jun. 15, 2018, 12 pages.

* cited by examiner (Modify)

(Track)

| Color | Index |
|---|---|
| Red | 0 |
| Blue | – |
| Green | 0 |
| Yellow | – |

| Color | Index |
|---|---|
| Red | 0 |
| Blue | 1 |
| Green | — |
| Yellow | — |

*FIG. 15E*

```
{
    "appKey": "B_e16voO6G6KG7bHYuCcTPTZ6RKex4A",
    "checkinUrls": [
        "http://server.apptimize.com/api/device/"
    ],
    "experiments": [
        {
            "name": "Send button text",              ← 402
            "paused": false,
            "type": "wysiwyg",
            "variations": [
                {
                    "id": 193,
                    "weight": 50.0,
                    "wysiwygData": null
                },
                {
                    "id": 194,
                    "weight": 50.0,
                    "wysiwygData": [
                        {
                            "data": {
                                "interfaceType": "phone-4inch",
                                "softwareVersion": "1.0",
                            "styles": [
                                {
                                    "properties": [
                                        {
                                            "property": "title",
                                            "value": {
                                                "disabled": "OK",
                                                "highlighted": "Ok",
                                                "normal": "Ok",
                                                "selected": "Ok"
                                            }
                                        }
                                    ],
                                    "selector": [
                                        {
                                            "controllerClass": "UINavigationController"
                                        },
                                        {
                                            "accessibilityKey": null,
                                            "index": null,
                                            "viewClass": "UILayoutContainerView"
                                        },
                                        {
```

400 (overall); 402 name; 404 data; 406 properties; 408 selector

*FIG. 16A-1*

```
            "accessibilityKey": null,
            "index": 0,
            "viewClass": "UINavigationTransitionView"     (continued)
        },
        {
            "accessibilityKey": null,
            "index": null, "viewClass": "UIViewControllerWrapperView"                    408
        },
        {
            "accessibilityKey": null,
            "index": 2,
            "viewClass": "UIView"
        },
        {
            "accessibilityKey": null,
            "index": 0,
              "viewClass": "_UIParallaxDimmingView"
        },
        {
            "accessibilityKey": null,
            "index": 1,
            "viewClass": "UIWindow"
        },
        {
            "accessibilityKey": null,
            "index": 1,
            "viewClass": "UIButton"
        }
        ]
      }
      ]
    },
    "platform": "iOS",
    "version": 1                    404
    }
    ]
  }
  ],
  "winner": null
}
```

*FIG. 16A-2*

```
      ]
    }
  ],
      "interfaceType": "phone-4inch",
      "softwareVersion": "1.0"
    },                                    ~ 414
    "platform": "iOS",
    "version": 1
  }
  ]
}
```

*FIG. 16B-2*

```
},
{
    "name": "change one cell",  ~ 702
    "paused": false,
    "type": "wysiwyg",
    "variations": [
      {
        "id": 198,
        "weight": 2.5,
        "wysiwygData": null
      },
      {
        "id": 199,
        "weight": 2.5,
        "wysiwygData": [
          {
            "data": {
                "interfaceType": "phone-4inch",   ~ 704
                "softwareVersion": "1.0",
                "styles": [
                  {
                    "properties": [
                      {
                        "property": "backgroundColor",   ~ 706
                        "value": {
                          "a": 1,
                          "b": 0.7254901960784313,
                          "g": 0.8196078431372549,
                          "r": 0.34901960784313724
                        }
                      }
                    ],
                    "selector": [
                      {
                        "controllerClass": "MainViewController"
                      },
                      {
                        "accessibilityKey": null,
                        "index": 2,
                        "viewClass": "UITableView"
                      },
                      {
                        "reuseIdentifier": "SimpleTableItem2",   ~ 712
                        "row": 8,
```
712 ~

```
                                              (continued)
        714 ─┐ ┌─────────────────┐
              │ "section": 0,    │
              │ "viewClass": "UITableViewCellScrollView"
              └─────────────────┘
            },
            {
                "accessibilityKey": null,
                "index": 0,                                    ⎫
                "viewClass": "UITableViewCellContentView"      ⎬ 708
            },                                                 ⎪
            {                                                  ⎪
                "accessibilityKey": null,                      ⎪
                "index": 0,                                    ⎪
                "viewClass": "UILabel"                         ⎭
            }
          ]
        }
      ]
    },
    ┌──────────────────┐
    │ "platform": "iOS", │ ─ 704
    │ "version": 1      │
    └──────────────────┘
  }
  ]
 }
 ],
 "winner": null
},
```

*FIG. 18A-2*

```
{
    "name": "chat bubble colors",                    ~ 802
    "paused": false,
    "type": "wysiwyg",
    "variations": [
        {
            "id": 195,
            "weight": 13.33,
            "wysiwygData": null
        },
        {
            "id": 196,
            "weight": 13.33,
            "wysiwygData": [
                {
                    "data": {
```

*FIG. 19A-1*

```
                                    "accessibilityKey": null,
                                    "index": 0,
                                    "viewClass": "UILabel"
                                }
                            ]
                        }
                    ]
                },
                "platform": "iOS",        ⎯ 804
                "version": 1
            }
        ]
    },
    {
```

USER INTERFACE MODIFICATION AND USAGE TRACKING

CROSS REFERENCE TO RELATED APPLICATIONS

This application is a continuation of, and claims the benefit of and priority to, U.S. patent application Ser. No. 14/506,990, filed on Oct. 6, 2014, and entitled "USER INTERFACE MODIFICATION AND USAGE TRACKING", which claims the benefit of and priority to U.S. Provisional Patent Application No. 61/929,939, filed on Jan. 21, 2014, and entitled "SYSTEM AND METHOD FOR RUNTIME MODIFICATION AND TRACKING OF USER INTERFACE", both of which are hereby incorporated herein by reference in their entirety.

BACKGROUND

Modern application programs that are designed to run on compact electronic devices such as a smartphone, media player, Personal Digital Assistant (PDA), cellular telephone, web appliance, computer, laptop computer or tablet computing device, for example, typically include a dynamic user interface that transitions frequently from one user interface display to a different one. Small screen size allows relatively little room for an interface display. A solution to this size limitation has been to dynamically swap out a currently displayed interface and to replace it with a different interface as needed. For example, one user interface display may present a menu of items that can be selected through user interaction with the user interface, and a next user interface display may show details of an item selected from the previous menu display. A typical application program can smoothly transition though multiple user interface displays in response to user input, for example. The transitions typically occur smoothly rather than abruptly so that a user can more easily perceive and follow them.

A dynamic user interface typically is generated using discrete object classes often referred to as view object classes. For consistency, these discrete view object classes shall be referred to herein as "views" although they also have been referred to alternatively as "widgets" or "controllers". The views may be part of a framework provided as system software within the device. Developer-created user interface elements typically include aggregates of these system-provided views. A view ordinarily is implemented as a view object class that knows how to draw itself, so as to produce a visual user interface element, within an area of the interface. Typically each view is associated with code to render itself and its children. Often the precise manner in which a view is rendered is not stored in a structured manner. As a result, for example, for some views, a child view may be rendered anywhere on a display screen or not at all, and children may be rendered in any order; the first child need not be rendered before the second child, for example. Thus, a view object configures a device to generate a visual user interface element represented by the view.

Views are used to create visual user interface elements that a user can see and interact with to change the user interface display. More specifically, some views are associated with methods that can configure a device to implement a transition between user interface displays in reaction to user interactions such as a user tapping or swiping a user interface display.

A user interface display may simultaneously include multiple different user interface elements, each produced using a different corresponding view. A view hierarchy serves as the primary mode of the layout organization of user interface elements in a user interface. The structure of a view hierarchy indicates the layout of corresponding user interface elements that correspond to views in the hierarchy. In general, a view can have subviews, and conversely, a subview can have a superview. Ordinarily, for example, if a view is removed from a view hierarchy, its subviews are removed also. If a view's location within a view hierarchy is moved, its subviews also move with it.

In some dynamic user interfaces, the screen areas that are occupied by user interface elements can overlap. In some user interfaces, a view's position in a view hierarchy dictates the order in which a user interface element that corresponds to the view is drawn, and thereby determines whether it appears in front of or behind other user interface elements that correspond to other views in a view hierarchy. Sibling subviews of the same superview can have a layering order that specifies which sibling view corresponds to a user interface element that is behind (i.e. beneath) another user interface element that corresponds to another sibling view. A sibling subview that is specified as being behind its sibling subview is drawn first, so if there is overlap in the areas of the sibling views, the user interface element corresponding to the first drawn sibling view will appear to be behind the later-drawn user interface element corresponding to its sibling. In other words, a view that is to appear at least partially in front of another view is drawn after the view that it is to hide so as to supersede drawing instructions for the underlying view. Similarly, a superview is drawn first, so it will appear to be behind its subviews.

A window object may be disposed at the top of a typical view hierarchy, and therefore, may be the ultimate superview of all other currently visible views. In general, a window is a type of view object that has an area that typically occupies the entire user interface display screen so as to form a background to all other currently visible views. Thus, other views are visible by virtue of being subviews of the window object.

In some dynamic user interfaces, the management of transitions between user interface displays resides in a view controller, which can be an instance of an object controller class. In some dynamic user interfaces, a view controller manages a single view, which can have subviews. A view controller typically can possess a view property that points to the view it manages. In some user interfaces, view controllers also can have hierarchical relationships with each other that align with the relationships among the views that they control. For example, in some user interfaces, a view controller can contain another view controller. The containing view controller can be referred to as the parent of the contained view controller and the contained view controller can be referred to as a child of the containing view controller. This containment relationship among the view controllers may be reflected in their views: a child view controller's view is a subview of the parent view controller's view.

In some prior interfaces, different user interface screen display corresponds to different view hierarchies in which views in the view hierarchy are used together to generate the visible user interface elements in the screen display. View controllers manage the views in a view hierarchy to generate corresponding user interface elements. Since multiple view controllers may be involved in managing multiple views, the view controllers coordinate with each other in managing the views to generate the visible user interface elements. In particular, in some user interfaces a root view controller may act to supply a view that covers the entire window and acts as the superview for all other controllers. Typically, in the course of a transition from one user interface screen display to the next, a user interface display associated with a previous view hierarchy is dismissed, so that it is no longer visible, and a next user interface display associated with a next view hierarchy is generated.

Often, an application program's view hierarchy includes a root view controller that may act as a navigation controller that allows other view controllers to be pushed and popped and that may cause a display of a header on a user interface screen display that may include a user interface button to "push" or "pop" a stack of view controllers, e.g., to go forward or back. In cases in which a root view controller acts as a navigation controller, it may handle animated transitions between user interface displays so as to provide smooth transitions that a device user can understand and follow more easily, for example.

FIGS. 1A-1B are illustrative drawings of an example application user interface screen display (FIG. 1A) and a corresponding view hierarchy (FIG. 1B) used to produce the display. FIG. 1A shows an illustrative example screen display 1302 that includes the following visual user interface elements: a navigation panel 1304, an item name panel 1306 and an item image panel 1308, which displays a photographic image (not shown) of the named item.

FIG. 1B shows an illustrative example view hierarchy 1322. Constituents of the view hierarchy include a window view object 1324, a view 1326 and a subview 1328. The window contains the view 1326. The view 1326 generates the navigation panel 1304. The view 1326 includes the subview 1328. The subview 1328 is used to generate the item name panel 1306 and the item image panel 1308. Constituents of the view hierarchy also include a UINavigationController 1330 and a UIViewControllerSubclass 1332. The UINavigationController 1330 controls the view object 1326. The UIViewControllerSubclass 1332 controls the subview object 1328. The UINavigationController 1330 is a parent of the UIViewControllerSubclass 1332. The UINavigationController 1330 acts as a root controller.

Application programs that include dynamic user interfaces may be distributed to thousands or millions of devices. It has become common practice in application program development to frequently iterate and change possible user interface designs even after distribution of the application. For example, changes may be made to an application while it remains available for use on a user device, without deploying a new version of the application, to experimentally ascertain which user interface designs users respond to most favorably. There has been a need for improvement in ease of user interface management involving changes to the application user interfaces of remotely located devices while interfaces remain available for use by device users.

SUMMARY

In one aspect, a method is provided to track events associated with a user interface display of an application at runtime. One or more information structures that associate an event tracking indicator with a view selector are stored, wherein the event tracking indicator indicates an event to be tracked, and the view selector indicates one or more constraints to be matched to select a view of the application associated with the event to be tracked. During execution of the application, the view selector is evaluated with views used by the application to determine whether each of the one or more constraints of the view selector matches properties of the views. In response to determining that each of the one or more constraints of the view selector matches the properties of at least one of the views, an occurrence of the event indicated by the event tracking indicator associated with the view selector is tracked.

In another aspect, one or more computer-readable storage media having program instructions stored thereon is provided to facilitate tracking events associated with a user interface display of an application at runtime. The program instructions, when executed by a computing system, direct the computing system to at least store one or more information structures that associate an event tracking indicator with a view selector, wherein the event tracking indicator indicates an event to be tracked, and the view selector indicates one or more constraints to be matched to select a view of the application associated with the event to be tracked. During execution of the application, the program instructions further direct the computing system to evaluate the view selector with views used by the application to determine whether each of the one or more constraints of the view selector matches properties of the views. The program instructions further direct the computing system to, in response to determining that each of the one or more constraints of the view selector matches the properties of at least one of the views, track an occurrence of the event indicated by the event tracking indicator associated with the view selector.

In another aspect, a computing apparatus comprises one or more computer-readable storage media, a processing system operatively coupled with the one or more computer-readable storage media, and an application stored on the one or more computer-readable storage media comprising program instructions to facilitate tracking events associated with a user interface display of the application at runtime. The program instructions, when executed by the processing system, direct the processing system to at least store one or more information structures that associate an event tracking indicator with a view selector, wherein the event tracking indicator indicates an event to be tracked, and the view selector indicates one or more constraints to be matched to select a view of the application associated with the event to be tracked. During execution of the application, the program instructions further direct the processing system to evaluate the view selector with views used by the application to determine whether each of the one or more constraints of the view selector matches properties of the views. The program instructions further direct the processing system to, in response to determining that each of the one or more constraints of the view selector matches the properties of at least one of the views, track an occurrence of the event indicated by the event tracking indicator associated with the view selector.

In another aspect, the event to be tracked comprises a user interaction with at least one user interface element of the view of the application associated with the event to be tracked.

In another aspect, the event to be tracked comprises a user interaction with at least one user interface element of the view of the application that was modified by a view modification indicator associated with the view selector.

In another aspect, the view modification indicator associated with the view selector indicates one or more modifications to be made to one or more of the views used by the application selected using the view selector.

In another aspect, the one or more constraints of the view selector are loosened with at least one don't care constraint so that the view selector matches a wider range of the views used by the application.

In another aspect, the one or more constraints of the view selector comprise visual property constraints and structural property constraints.

In another aspect, the structural property constraints include layout properties.

In another aspect, a method is provided to modify a view used by an application to generate a user interface element on a display screen of an electronic device. A view selector stored by a storage device associated with the electronic device identifies a hierarchy of selector visual property constraints and associated selector structural property constraints. Modification information stored by the storage device indicates one or more modifications to one or more views selected using the view selector. In the course of running the application on the electronic device, a determination is made as to whether an application view hierarchy that is used by the application includes an application subview hierarchy that includes views that define a hierarchy of visual property constraints and associated structural property constraints that match the identified hierarchy of selector visual property constraints and associated selector structural property constraints. In response to determining a match, a modification indicated by the modification information is imparted to one or more views of the matching application subview hierarchy.

In another aspect, a method is provided to use of a view by an application to generate a user interface element on a display screen of an electronic device. View selector information is received that identifies a hierarchy of selector visual property constraints and associated selector structural property constraints. In the course of running the application on the electronic device, a determination is made as to whether an application view hierarchy includes an application subview hierarchy that includes views that define a hierarchy of visual property constraints and associated structural property constraints that match the identified hierarchy of selector visual property constraints and associated selector structural property constraints. A message is sent over a network to a monitoring system to indicate use of the application subview hierarchy.

In another aspect, an article of manufacture is provided that includes a computer readable storage device is encoded with an information structure that comprises a hierarchy of selector visual property constraints and associated selector structural property constraints. One or more of the visual property constraints indicates a don't care visual property constraint or one or more of the structural property constraints indicates a don't care structural property constraint.

In another aspect, a method is provided to produce an information structure to select an application subview hierarchy. A visual representation of multiple views within a view hierarchy is produced on a display screen. A user interface to receive user input to select a view from among the multiple displayed views is produced on the display screen. User input indicating user selection of a view from among the multiple displayed views is received. A hierarchy of selector visual property constraints and associated selector structural property constraints that match a subview hierarchy that corresponds to the selected view is generated.

BRIEF DESCRIPTION OF DRAWINGS

The drawings are listed below in the order in which they are presented in this written disclosure rather than in numerical order of the Figure numbers.

FIGS. 15A-15E are illustrative drawings representing a sequence of developer system user interface screen displays used to designate a first change in an application user interface of a device in accordance with some embodiments.

FIG. 16A1-16A2 are illustrative drawings representing code of an example first information structure stored in a computer readable storage device that is created in response to user input provided in connection with the example screen displays of FIGS. 15A-15F.

FIG. 16B1-16B2 are illustrative drawings representing code of an example second information structure stored in a computer readable storage device that is created in response to user input provided in connection with the example screen displays of FIGS. 15A-15F.

FIGS. 18A1-18A2 are illustrative drawings showing code of an example information structure of a third selector stored in a computer readable storage device that corresponds to developer user input of the eighth developer screen of FIG. 17B in accordance with some embodiments.

FIGS. 19A1-19A3 are illustrative drawings showing code of an example information structure of a fourth selector stored in a computer readable storage device that corresponds to developer user input of the ninth developer screen of FIG. 17C in accordance with some embodiments.

DESCRIPTION OF EMBODIMENTS

Figure 1A:
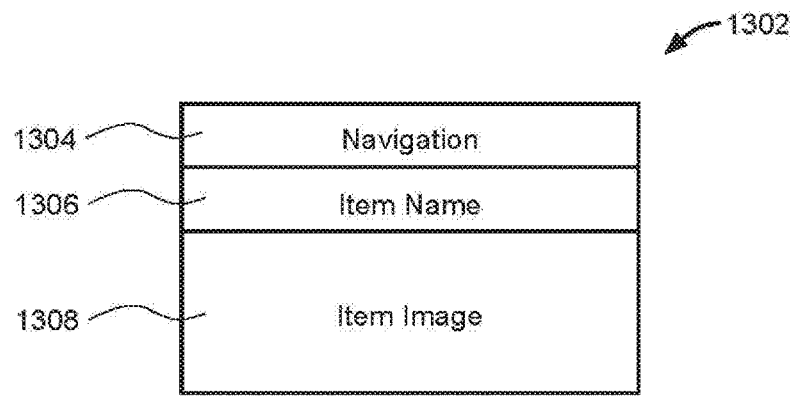
FIGS. 1A-1B are illustrative drawings of an application user interface screen display (FIG. 1A) and a corresponding view hierarchy (FIG. 1B) used to produce the display.
Figure 1B:
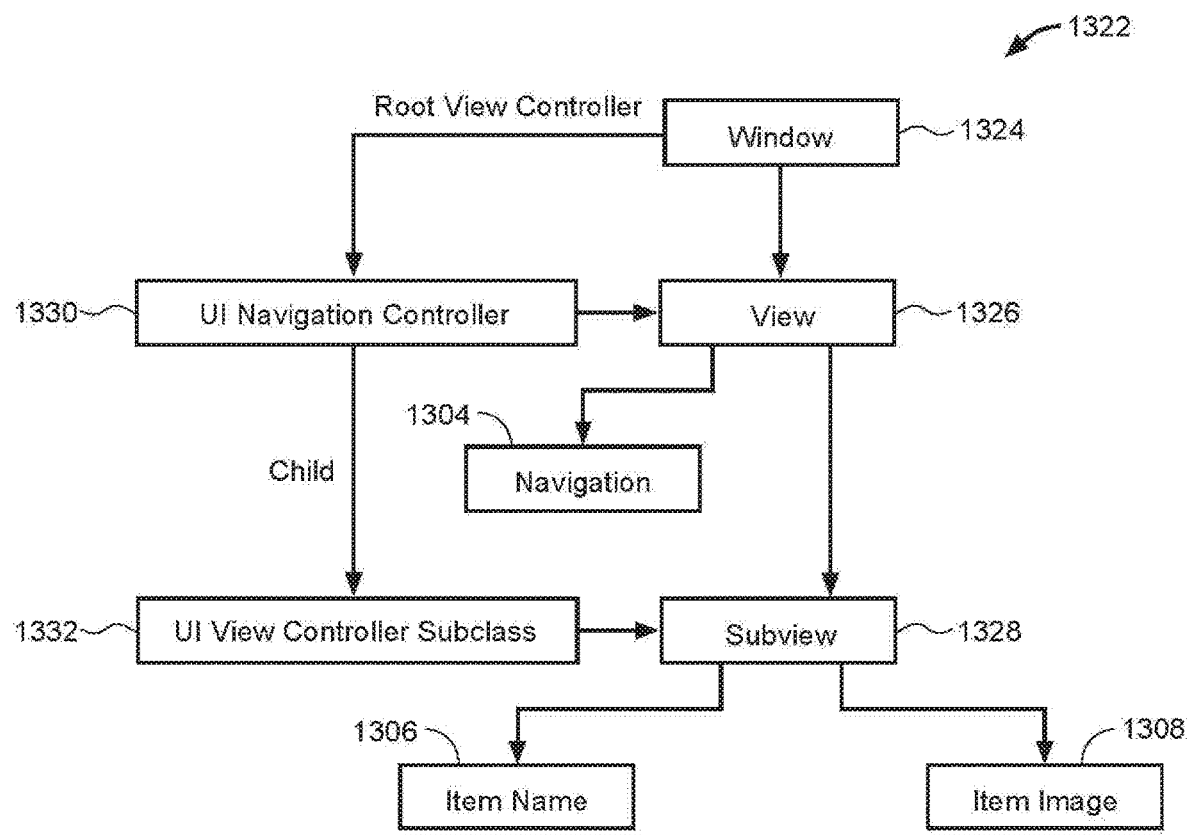

The following description is presented to enable any person skilled in the art to create and use a system to select and modify views in a view hierarchy used to produce a user interface display in an electronic device and to track usage of such views. Various modifications to the embodiments will be readily apparent to those skilled in the art, and the generic principles defined herein may be applied to other embodiments and uses without departing from the spirit and scope of the inventive subject matter. Moreover, in the following description, numerous details are set forth for the purpose of explanation. However, one of ordinary skill in the art will realize that the inventive subject matter might be practiced without the use of these specific details. In other instances, well-known machine components, processes and data structures are shown in block diagram form in order not to obscure the disclosure with unnecessary detail. Identical reference numerals may be used to represent different views of the same item in different drawings. Flow diagrams in drawings referenced below are used to represent processes. A computer system may be configured to perform some of these processes. Modules within flow diagrams representing computer implemented processes represent the configuration of a computer system according to computer program code to perform the acts described with reference to these modules. Thus, the inventive subject matter is not intended to be limited to the embodiments shown, but is to be accorded the widest scope consistent with the principles and features disclosed herein.

Processes to Match View Selectors and Subview Hierarchies

A computer program code application typically includes a variety of different views contained within a variety of different view hierarchies that are used to generate a corresponding variety of different user interface displays. During the running of an application on a device, different user interface displays may be presented in response to different user inputs, for example. Thus, in the course of running an application, the user interface display that is presented for viewing by a user may change frequently in response to user input, for example. A different view hierarchy is used to produce each different user interface display. More specifically, the application program configures the device to call upon different view hierarchies to produce different user interface displays. In some embodiments, an application configures a device to use operating system software to use the view hierarchies associated with the application to configure a device to generate the application's user interface displays.

Figure 2:
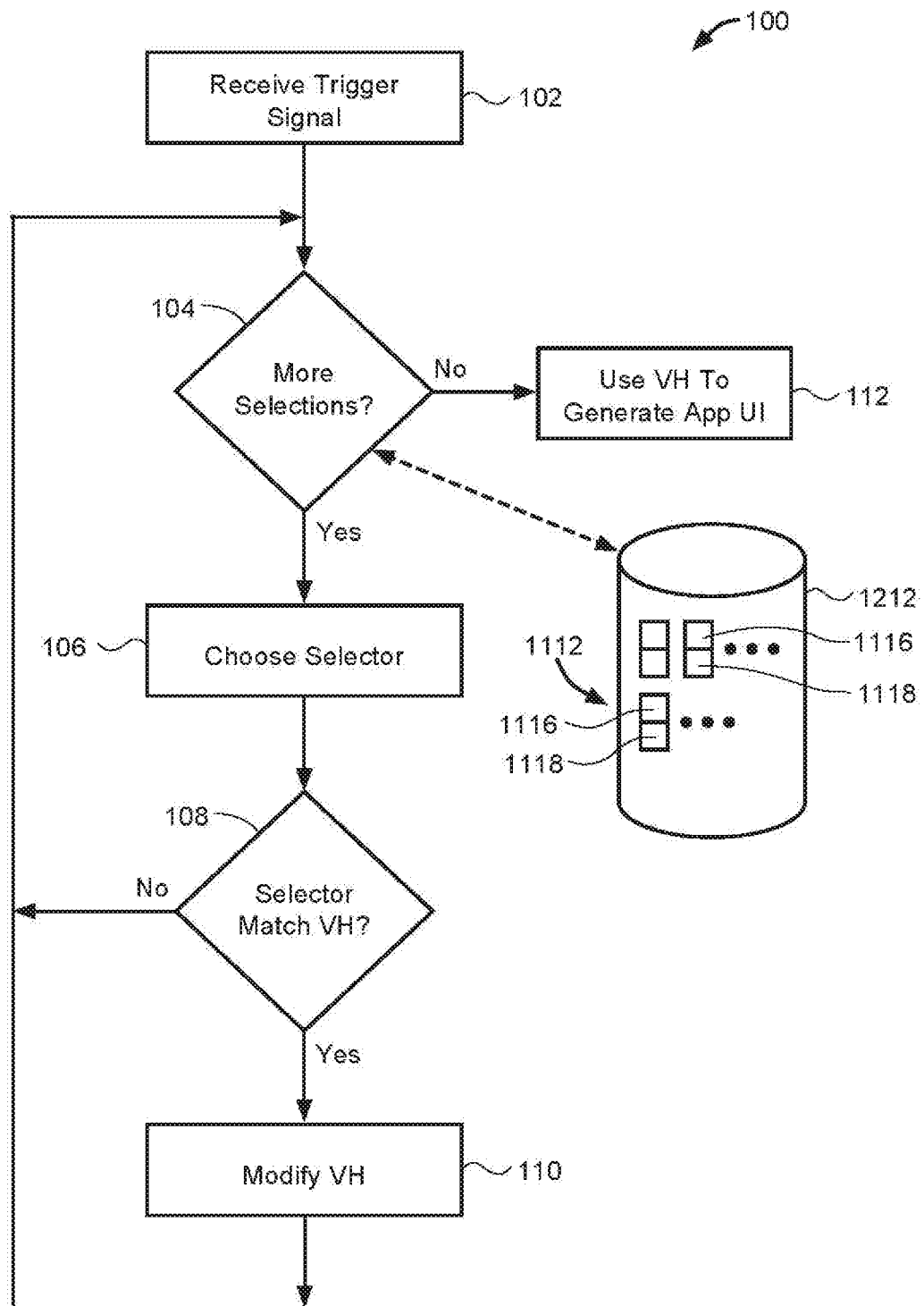
FIG. 2 is an illustrative flow diagram representing a process to make modifications to one or more views used by an application to generate one or more corresponding user interface elements in accordance with some embodiments.

FIG. 2 is an illustrative flow diagram representing a process 100 to make modifications to one or more views used by an application to generate one or more corresponding user interface elements in accordance with some embodiments. Module 102 configures a device to receive an indication of an occurrence of an event that triggers an evaluation of whether a modification is required to a view used by the application. In some embodiments, an event that triggers evaluation can be a transition from one user interface display to a next user interface display in response to user input. For example, a user may provide input to scroll or to jump to a different screen or to otherwise invoke a transition from one user interface display to the different one. To make the transition happen, the application calls upon a next view hierarchy to produce the next user interface display. Before actually using that next view hierarchy to generate the next user interface display, however, a determination is made, as explained more fully below, as to whether to first make a modification to that next view hierarchy.

Thus, in accordance with some embodiments, module 102 configures the device to determine whether there is an impending use of a next view hierarchy to generate a next user interface display. For example, allocation of memory space for creation of the next view hierarchy typically indicates impending use of a next view hierarchy and may act as a trigger event. In response to an occurrence of a trigger event, decision module 104 determines whether one more first view selectors are associated with the application, and if so, whether one or more first view selectors that are determined to be associated with the application have not yet been used to evaluate whether to modify a view to be used by the application in response to the trigger event.

As explained more fully below with reference to FIGS. 11-14, a computer readable storage device 1212 can store one or more information structures 1112 that associate view modification indicators 1116 with first view selectors 1118. A view modification indicator 1116 indicates one or more modifications to be made to a view. A view selector 1118 indicates one or more constraints to be matched to select a view that is to be modified. In some embodiments, constraints can include view properties such as view class object type, structural relationships between views such as a superview/subview (parent/child) relationship, and visual appearance properties. Examples of visual appearance properties include color and text size and font.

In response to a determination by decision module 104 that one or more selectors require evaluation in response to the most recent trigger event, module 106 configures the device to choose a selector 1118 stored in device 1212 for evaluation. Decision module 108 configures the device to determine whether each of one or more constraints of a currently chosen selector matches properties of a subview hierarchy of one or more views of an impending view hierarchy that is to be used to generate an upcoming user interface display. In response to a determination by decision module 108 that each constraint of the chosen selector matches a property of a subview hierarchy of a view within an impending view hierarchy, module 110 configures the device to modify the view hierarchy according to a modification 1116 stored in device 1212 in association with the currently chosen first selector. Control next flows back to decision module 104. In response to a determination by decision module 108 that at least one constraint of the chosen selector does not match a property of a view within the impending view hierarchy, control flows to decision module 104.

In response to a determination by decision module 104 that there are no first view selectors that remain to be evaluated in response to the most recent trigger event, control flows to module 112, which configures the device to use the impending view hierarchy, as modified by module 110 to include each change required by each matching first view selector, to generate a next user interface display. If no changes were made by module 110, then module 112 configures the device to use the impending view hierarchy, as originally configured, to generate a user interface for display on a device display screen.

Figure 3A:
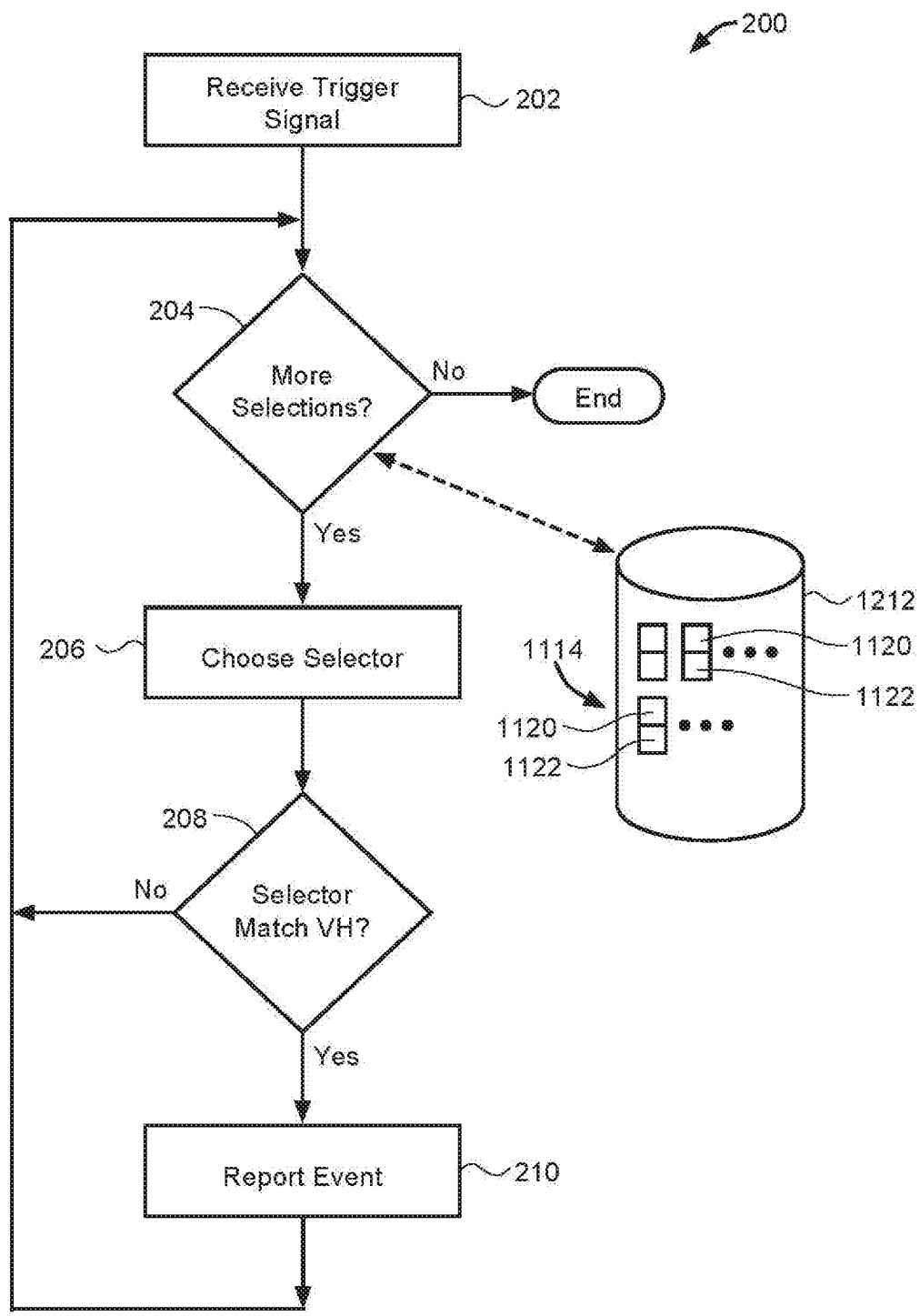
FIG. 3A is an illustrative flow diagram representing a process to track occurrence of events within a user interface display in accordance with some embodiments.

FIG. 3A is an illustrative flow diagram representing a process 200 to track occurrence of events within a user interface display in accordance with some embodiments. Module 202 configures the device to receive an indication of an occurrence of a user input event, such as a click or selection of a particular user interface element or scrolling, for example. In response to an occurrence of a user input trigger event, decision module 204 determines whether one more second view selectors are associated with the application, and if so, whether one or more second view selectors that are determined to be associated with the application have not yet been used to evaluate whether to track a view used by the application in response to the user input event.

As explained more fully below with reference to FIG. 11-14, a computer readable storage device 1212 can store one or more information structures 1114 that associate event tracking indicators 1120 with second view selectors 1122. A view tracking indicator 1120 indicates view usage to be tracked. A second view selector 1122 indicates one or more constraints to be matched to select a view usage to be tracked. In some embodiments, constraints can include view properties such as view class object type, visual appearance and layout. Examples of visual appearance properties include color and text font. Examples of layout properties include structural relationships among views in a subview hierarchy.

In response to a determination by decision module 204 that one or more second view selectors require evaluation in response to the most recent user input trigger event, module 206 configures the device to choose a second view selector 1122 for evaluation. Decision module 208 configures the device to determine whether each of one or more constraints of a currently chosen second view selector 1122 matches a property of a subview hierarchy of one or more views determined to be used in response to the user input. In response to a determination by decision module 208 that each constraint of the chosen second view selector matches a property of a subview hierarchy of the view used in response to the user input, module 210 configures an event indicator 1120 associated in the device 1212 with the currently selected second view selector 1122 to report usage of the view. Control next flows back to decision module 204. In response to a determination by decision module 208 that at least one constraint of the chosen second view selector does not match, control flows to decision module 204. In response to a determination by decision module 204 that there are no (additional) second view selectors 1122 that require tracking in response to the most recent user input trigger event, the process 200 ends.

It will be appreciated that user interaction with an application user interface, such as clicking a control button, typically triggers a change in a view hierarchy which in turn results in a change in the user interface display. Thus, reporting a view hierarchy change, in effect, reports the user action that triggered the change. The reported user interactions can be used, for example, for AB testing to ascertain user reaction to runtime changes to user interface elements of an application user interface.

It will be understood that the first and second view selectors 1118, 1122 may be one and the same so as to track usage of views that have been modified.

Figure 3B:
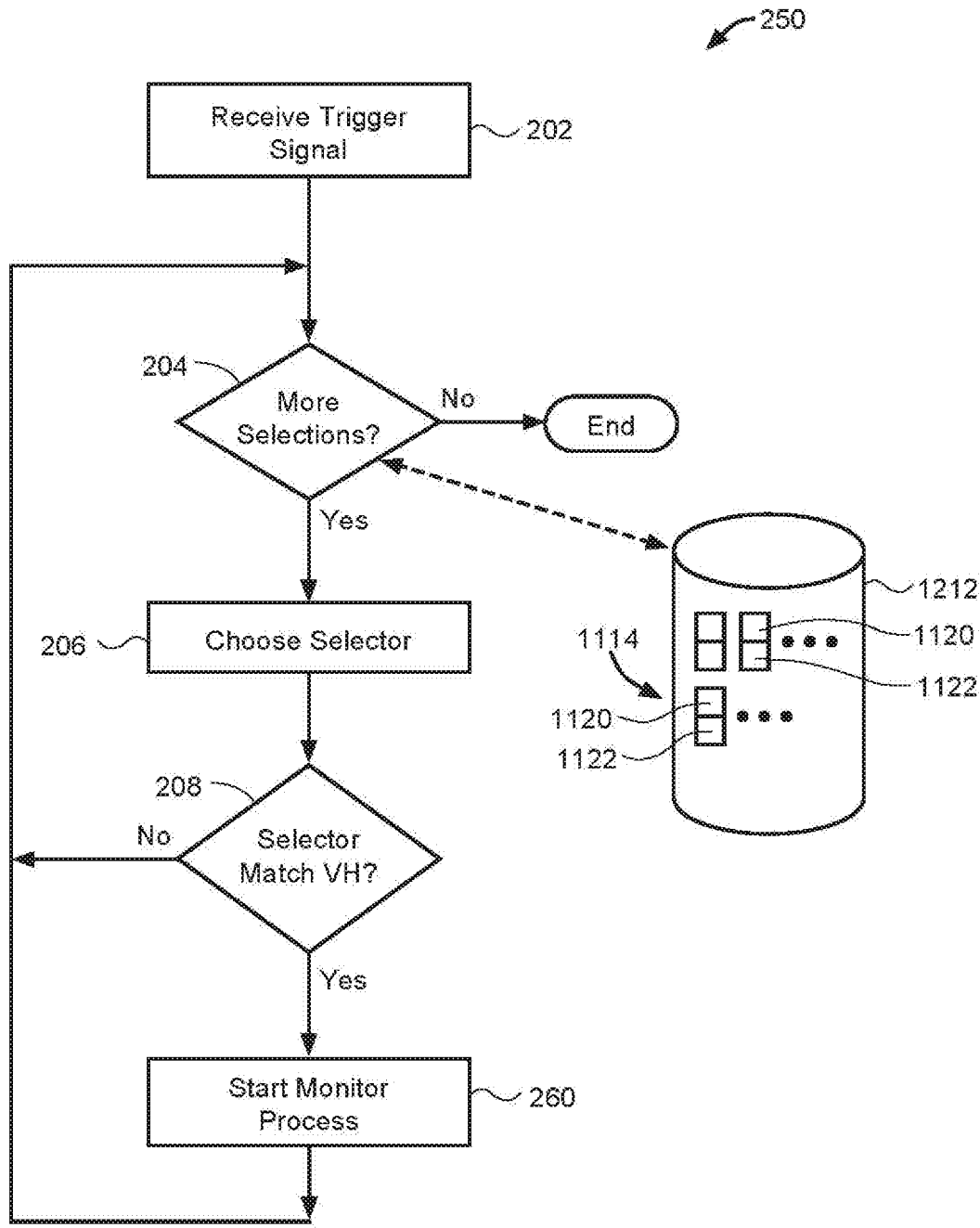
FIG. 3B is an illustrative flow diagram representing a process to track occurrence of events within a user interface display in accordance with some embodiments.
Figure 3C:
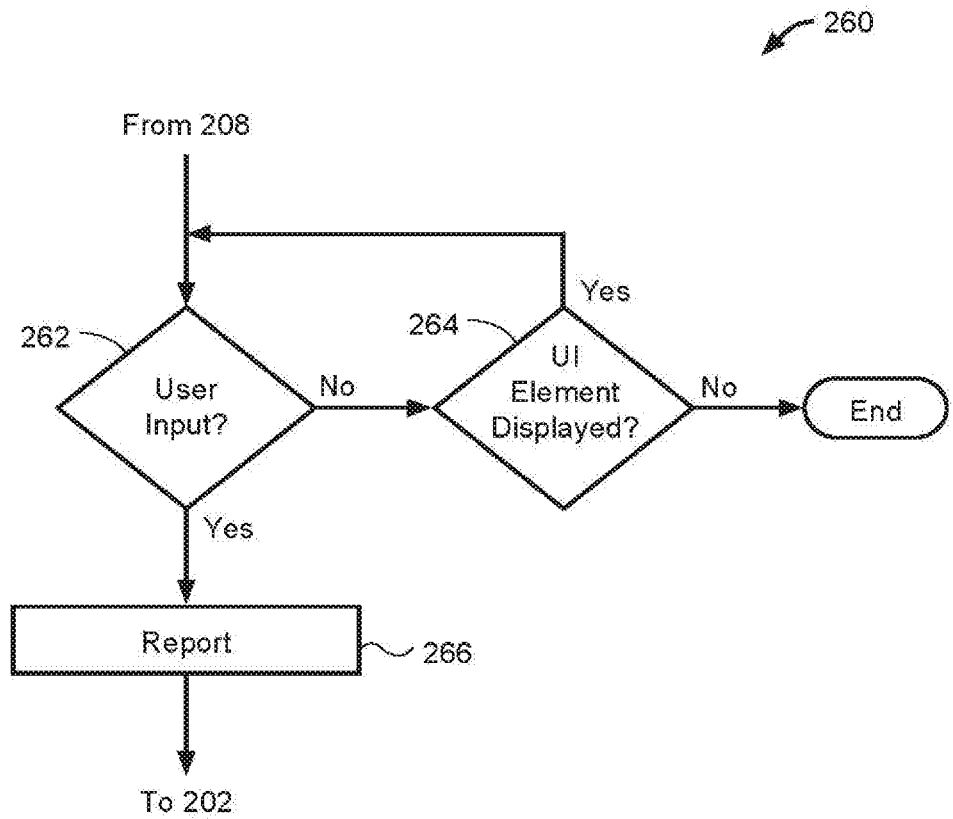
FIG. 3C is an illustrative drawing of a monitor process to monitor user input to a visual user interface element identified using the process of FIG. 3B in accordance with some embodiments.

FIG. 3B is an illustrative flow diagram representing a process 250 to track occurrence of events within a user interface display in accordance with some embodiments. FIG. 3C is an illustrative drawing of a monitor process 260 to monitor user input to a visual user interface element identified using the process of FIG. 3B in accordance with some embodiments. It will be appreciated that the process 200 is similar to process 250. Only those portions of the process 250 that differ from the monitor process 200 shall be described. Specifically, in response to a determination by decision module 208 that each constraint of the chosen second view selector matches a property of a subview hierarchy of the view used in response to the user input, a process 260 that includes a decision module 262 that monitors user input to identify user input using to a visual user interface element that corresponds to a subview hierarchy identified by decision module 208 as matching a chosen second view selector. While the decision module 262 continues to monitor, a decision module 264 monitors the view hierarchy to determine whether the visual user interface element continues to be displayed. If decision module 264 determines that it is no longer being displayed, then the process 260 ends. If decision module 264 determines that it is still being displayed then decision module 262 continues to monitor for user input. In response to decision module 262 determining that user input is provided to the visual user interface element, module 266 reports the user input corresponding to the matching subview hierarchy.

It will be appreciated, for example, that the visual user interface element may be a button or slider or other user interface input element, and that the processes 250, 260 can be used to detect and report user input using the user interface element. Moreover, as mentioned above, it will be appreciated that multiple user input elements can be monitored simultaneously using the processes 250, 260.

Triggering Selector Operation

In accordance with some embodiments, module 102 can use a wrapper to detect a trigger event as explained with reference to FIG. 4. In accordance with some embodiments, module 102 can use "swizzling" to detect a trigger event as explained with reference to FIG. 5.

Figure 4:
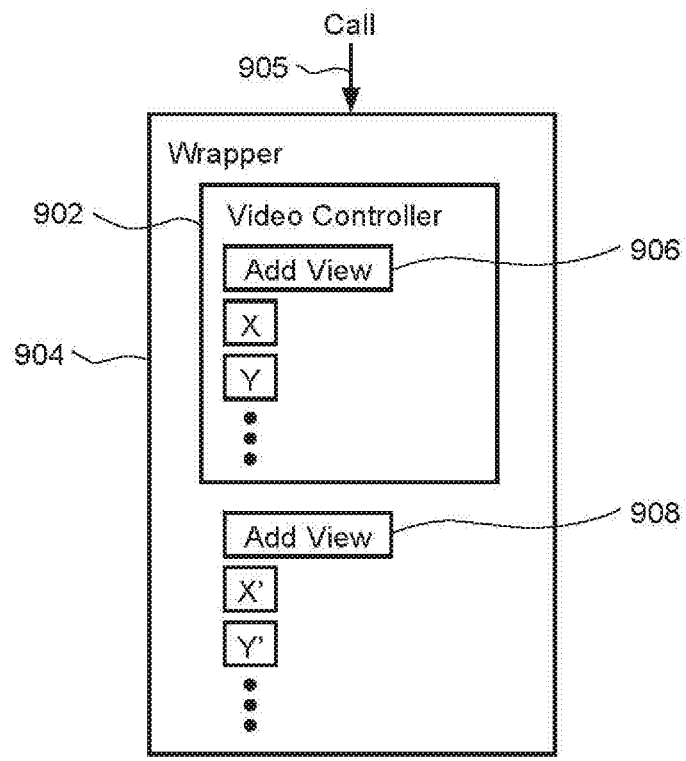
FIG. 4 is an illustrative object class diagram that represents a relationship between a view controller object and a wrapper object in accordance with some embodiments.

FIG. 4 is an illustrative object class diagram that represents a relationship between a view controller object and a wrapper object in accordance with some embodiments. In general, a wrapper object class, which sometimes is referred to as a proxy, "wraps" or "encapsulates" functionality of another object class. View controllers control the creation of view hierarchies in order to change an application user interface view. Since user interface views may change frequently view controllers and view hierarchies used to generate the different views are created and dismissed frequently. In accordance with some embodiments, in the course of creating a view controller 902, a wrapper 904 also is created that "wraps" the view controller 902. The view controller 902 can include an add view function 906 and can include additional functions x, y, etc. The wrapper 904 also includes a corresponding add view function 908 and corresponding additional functions x', y', etc. In operation, the wrapper 904 intercepts calls to the view controller 902. In response to an intercepted call 905 to the add view function 906, the wrapper's add view function 908 triggers the process 100 of FIG. 2, which can result in modification of one or more properties of a view hierarchy that includes the view that is to be created in response to the call. The wrapper's add view function 908 then calls the view controller's add view function 906 to add the view. In response to intercepted calls to functions x or y, for example, the wrapper's corresponding functions x' and y' call the view controller's x and y functions, for example.

Figure 5:
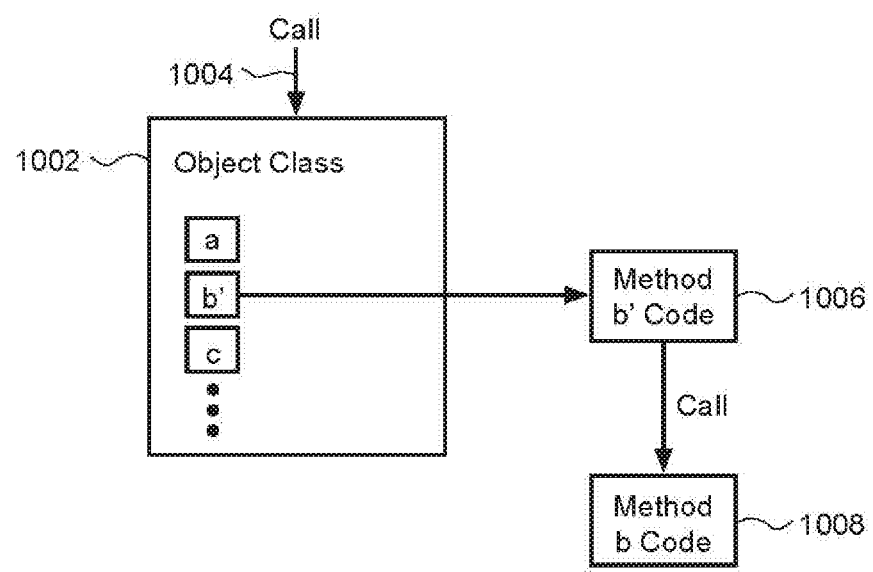
FIG. 5 shows an example view class that includes a substituted method in accordance with some embodiments.

FIG. 5 is an illustrative object class diagram that represents an object class in which a method has been "swizzled" in accordance with some embodiments. As used herein the term "swizzle" refers to substitution of a method into a class that makes use of the substituted for method as if for example, the substituted for function acts as a subclass of the added method. FIG. 5 shows an example view class 1002 that includes methods a and c and substituted method b. In response to a call 1004 to method b to add a view, for example the object 1002 calls the swizzled method b' code 1006 instead. The swizzled method b' code triggers the process 100 of FIG. 2, which can result in modification of one or more properties of a view hierarchy that includes the view that is to be created in response to the call. The swizzled method b' then calls the method b code 1008 to add the view.

First Example View Selector Match Determinations

Figure 6:
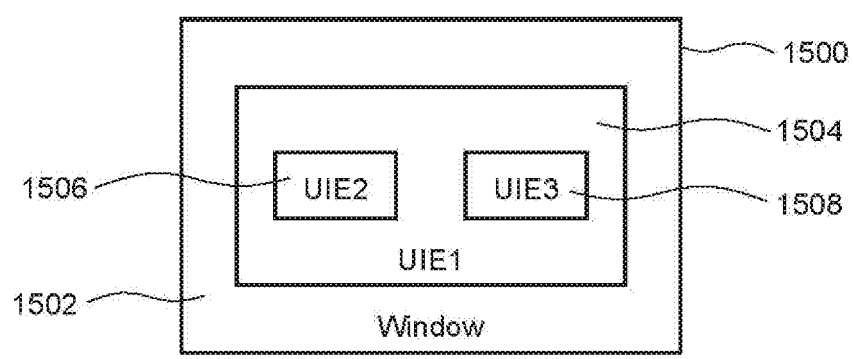
FIG. 6 is an illustrative drawing of an example application user interface screen.

FIG. 6 is an illustrative drawing representing an example application user interface screen display 1500 produced by an application at runtime. The example screen display includes a window region 1502, a first user interface element (UIE1) 1504, a second user interface element (UIE2) 1506 and a third user interface element (UIE3) 1508. It will be appreciated that first UIE1 1504 can be a background element that completely obscures the window element 1502 and that UIE2 1506 and UIE3 1508 each partially obscures the first UIE1 1504.

Figure 7A:
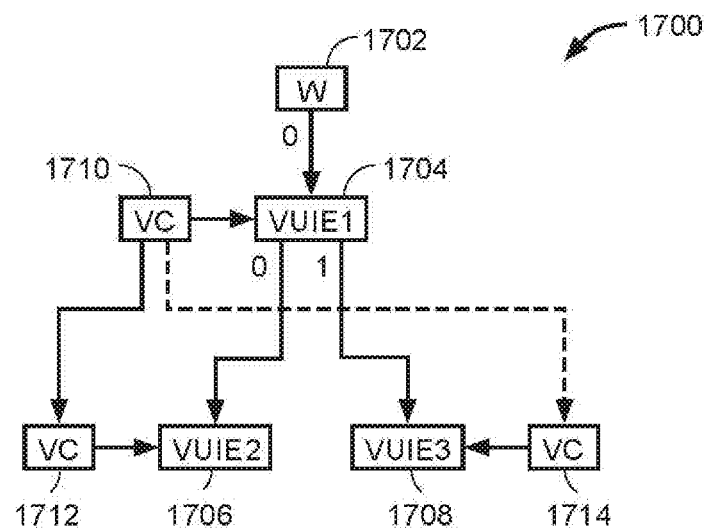
FIG. 7A is an illustrative drawing representing an example application view hierarchy used by an application to produce the user interface screen display of FIG. 6.

FIG. 7A is an illustrative drawing representing an example application view hierarchy 1700 used by an application to produce the user interface screen display 1500 of FIG. 6 in accordance with some embodiments. The view hierarchy 1700 can be stored in a non-transitory computer readable storage device. Structural relationships between views in a view hierarchy define traversal paths between views in the view hierarchy. The traversal paths can be used during rendering of visual interface elements to determine which visual interface elements are most closely related to each other in a user interface display. More particularly, in accordance with some embodiments, structural relationships include view-subview relationships between views.

More specifically, for example, at the top of the view hierarchy 1700 is a viewWINDOW 1702. An index structure labeled (0), which may include a pointer structure and which is disposed between the viewWINDOW 1702 and a first view (ViewUIE1) 1704, indicates a hierarchical traversal path between the viewWINDOW 1702 and a first view (ViewUIE1) 1704. In a hierarchical relationship defined by the index structure labeled (0) between the viewWINDOW 1702 and the first view (ViewUIE1) 1704, the first view (ViewUIE1) 1704 is a subview of the viewWINDOW 1702. Thus, the first view (ViewUIE1) 1704 has a subview structural relationship with viewWINDOW 1702. The first view (ViewUIE1) 1704 is used, during rendering, to generate the first user interface element UIE1 1504.

An index structure labeled (0), which may include a pointer structure and which is disposed between the first view (View UIE1) 1704 and a second view (ViewUIE2) 1706, indicates a hierarchical traversal path between the first view (ViewUIE1) 1704 and the second view (ViewUIE2) 1706. In a hierarchical relationship defined by the index structure labeled (0) between the first view (ViewUIE1) 1704 and the second view (ViewUIE2) 1706, the second view (ViewUIE2) 1706 is a subview of the first view (ViewUIE) 1704. Thus, the second view (ViewUIE) 1706 has a subview structural relationship with the first view (ViewUIE1) 1704. The second view (ViewUIE2) 1706 is used to generate the second user interface element UIE2 1506.

An index structure labeled (1), which may include a pointer structure and which is disposed between the first view (View UIE1) 1704 and a third view (ViewUIE3) 1708, indicates a hierarchical traversal path between the first view (ViewUIE1) 1704 and the third view (ViewUIE3) 1708. In a hierarchical relationship defined by the index structure labeled (1) between the first view (ViewUIE1) 1704 and the third view (ViewUIE3) 1708, the third view (ViewUIE3) 1708 is a subview of the first view (ViewUIE1) 1704. Thus, the third view (ViewUIE3) 1708 has a subview structural relationship with the first view (ViewUIE1) 1704. The third view (ViewUIE3) 1708 is used to generate the third user interface element UIE3 1508.

Moreover, the index (0) and the index (1) are "ordered" within a hierarchy level in that each is associated with the same view, i.e. the both indices (0) and (1) are associated with the upper first view 1704, but each index is associated with a different lower subviews, i.e. index (0) is associated with the second view 1706 and index (1) is associated with the third view 1708.

In accordance with some embodiments, a first ViewCONTROLLER 1710 controls the first view (ViewUIE1) 1704. A second ViewCONTROLLER 1712 controls the second view (ViewUIE2) 1706. A third ViewCONTROLLER 1714 controls the third view (ViewUIE3) 1708. The first ViewCONTROLLER 1710 also manages the second ViewCONTROLLER 1712 and the third ViewCONTROLLER 1714.

Thus, structural relationships among the first view 1704 and the second and third views 1706 and 1708 are further defined in terms of index properties, which can correspond to pointer structures, that can be used to define traversal paths from one view to another within a view hierarchy. The first view 1704 includes a first index labeled (0) and a second index labeled (1). The second view 1706 is associated with the first index (0) of the first view 1704. The third view is associated with a second index (1) of the first view 1704.

It will be appreciated that the indices (0) and (1) of the first view 1704 are associated with a different traversal paths. The association of the first index (0) with the second view 1706 defines a traversal path from the first view 1704 to the second traversal path 1706. The association of the second index (1) with the third view 1708 defines another traversal path from the first view 1704 to the third traversal path 1706.

Furthermore, in the illustrative drawings of FIGS. 7A-7B and FIGS. 8A-8C, described below, labels placed on the different component views represent visual properties of the views. Thus, for example, the first view 1704 has visual property "VUIE1". The second view 1706 has visual property "VUIE2", and the third view 1708 has visual property "VUIE3". It will be appreciated that these labels are used to simplify the explanation and that actual visual properties may include color, text size, font size, images, background color, text color, text style (e.g., bold or italic), font face, text alignment, view width/height, position, padding, orientation and visibility, for example.

Figure 7B:
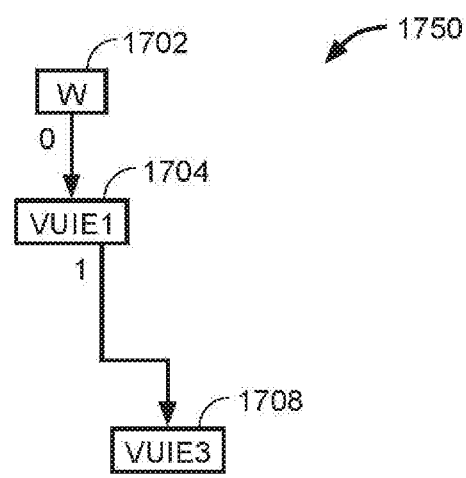
FIG. 7B is an illustrative drawing that shows an application subview hierarchy that may act as a selector information structure in accordance with some embodiments.

FIG. 7B is an illustrative drawing that shows an application subview hierarchy 1750 that may act as a view selector, during processes 100 and 200, in accordance with some embodiments. The application subview hierarchy/view selector 1750 can be stored in a non-transitory computer readable storage device. The application subview hierarchy 1750 includes as visual property constraints, the third view (ViewUIE3) 1708, the first view (View UIE1) 1704 and the viewWINDOW 1702. It will be appreciated that the application subview hierarchy 1750 manifests the structural property constraints of its components, and that these structural property constraints act as selector constraints when the application subview hierarchy 1750 acts as a view selector during processes 100, 200. The application subview hierarchy 1750 includes as a first structural property constraint, the view-subview relationship between the Window 1702 and the first view 1704, indicated by the index labeled (0) between the Window 1702 and the first view 1704. The application subview hierarchy 1750 includes as a second structural property constraint view-subview relationship between the first view 1704 and the third view 1708, indicated by the index labeled (1) between the first view 1704 and the third view 1708.

Thus, the application subview hierarchy 1750 defines a structural traversal path that leads to and thereby identifies the third view 1708. In particular, the traversal path starts with the Window 1702, at the top of the application subview hierarchy 1750, passes through the first view 1704, and ends with the third view 1708 at the bottom of the subview hierarchy 1750. The third subview 1708 can be identified by following the traversal path defined by the subview hierarchy 1750.

The respective visual properties VUIE1, VUIE2 and VUI3 of the components 1704, 1706 and 1708 also can act as constraints when the subview hierarchy 1750 acts as a view selector during processes 100 and 200, although in the illustrative examples involving view hierarchies 1900, 1920 and 1940, discussed below, the focus is on structural relationships among views that define traversal paths.

It will be appreciated that the Window 1702 acts as a "root" node of the application subview hierarchy acting as a view selector 1750, and that the third view 1708 acts as a bottom node of the application subview hierarchy acting as a view selector 1750. In accordance with some embodiments, a matching determination according to respective decision modules 108 and 208 is used to determine whether there exists a view hierarchy in an application view hierarchy that matches the application view hierarchy 1750 acting as a selector. It will be appreciated that although the third subview 1708 is at the bottom of the selector subview hierarchy 1750, and therefore acts as a "leaf node", a selector subview hierarchy need not include a leaf node. In other words, a selector can match a view within an application view hierarchy even though the application view hierarchy contains views beneath the bottom view in the selector view hierarchy.

Figure 8A:
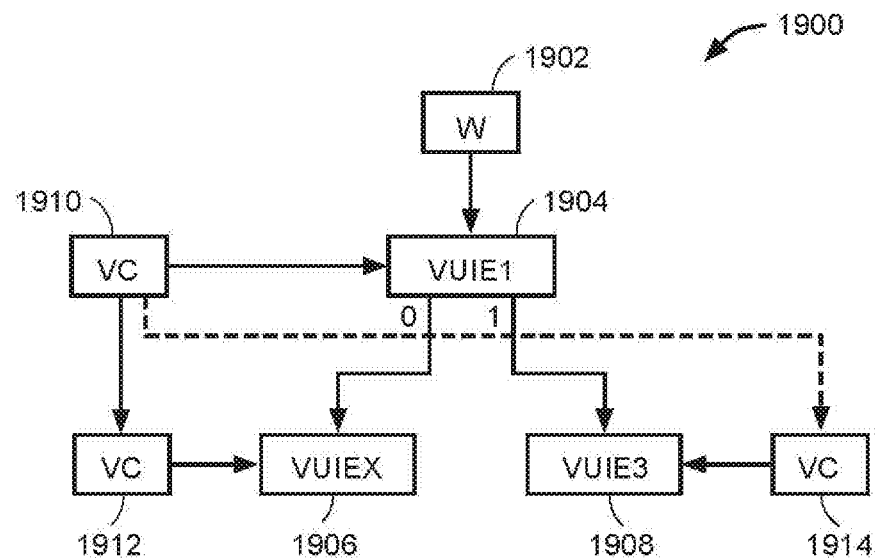
FIG. 8A is an illustrative drawing representing an example first application view hierarchy that is produced at runtime in the course of the running of the application of FIG. 7A.
Figure 8B:
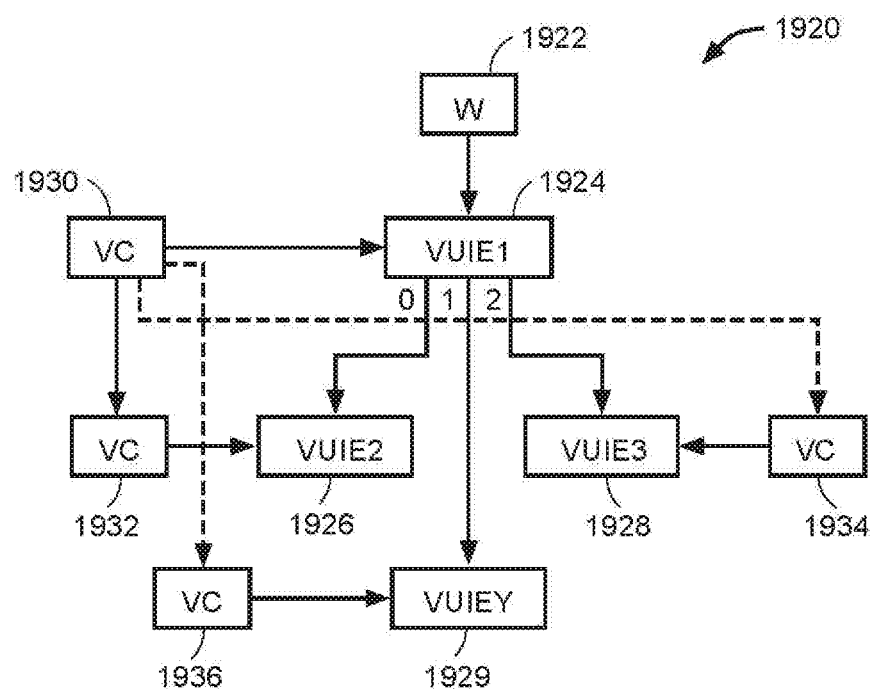
FIG. 8B is an illustrative drawing representing an example second application view hierarchy that is produced at runtime in the course of the running of the application of FIG. 7A.
Figure 8C:
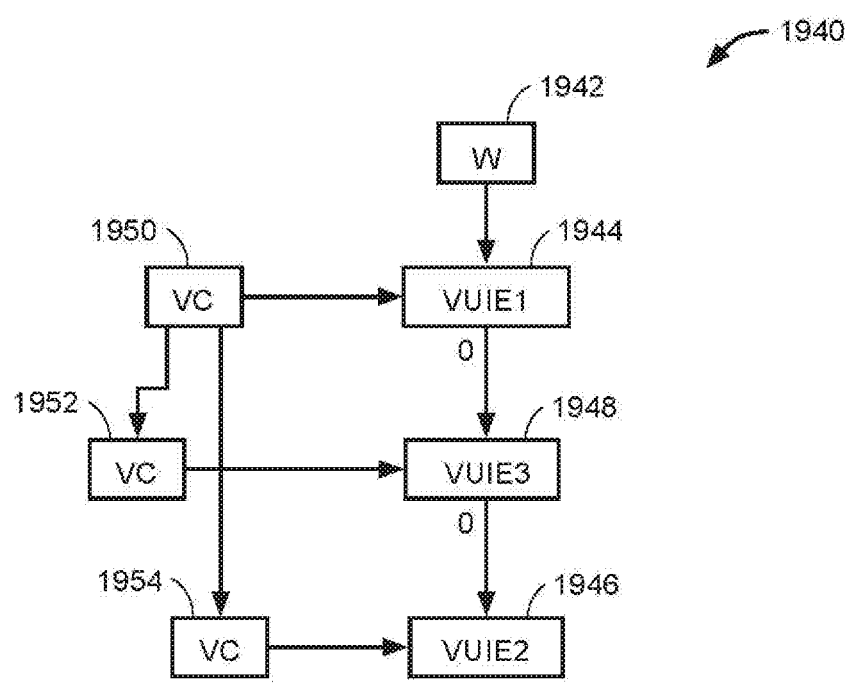
FIG. 8C is an illustrative drawing representing an example third application view hierarchy that is produced at runtime in the course of the running of the application of FIG. 7A.

FIGS. 8A-8C show three different illustrative example application view hierarchies 1900, 1920 and 1940 that can be generated by the same example application that generates the illustrative view hierarchy 1700 of FIG. 7A. These three example view hierarchies are used to generate three different user interface displays (not show). In accordance with some embodiments, the processes 100 and/or 200 of FIGS. 2-3 determine whether the subview hierarchy 1750 of FIG. 7B, acting as a view selector, selects, and therefore identifies, a view in any of the three example view hierarchies 1900, 1920, 1940 for modification and/or tracking. More specifically, in accordance with some embodiments, decision modules 108 and 208 of respective processes 100 and 200 determine whether there is a match of structural and visual properties of the application subview hierarchy 1750, which acts as a view selector, and one or more of the example subview hierarchies view hierarchies 1900, 1920, 1940.

FIG. 8A is an illustrative drawing representing an example first application view hierarchy 1900 that is produced at runtime in the course of the running of the application. At the top of the view hierarchy 1900 is a viewWINDOW 1902. The first view hierarchy 1900 includes a first view (ViewUIE1) 1904, which is a subview of the viewWINDOW 1702. The view hierarchy 1900 includes an "X" view (ViewUIEX) 1906, which is a subview of the ViewUIE1 1904. Assume that in this illustrative example, VUIEX 1906 of FIG. 8A and VUIE2 1706 of FIG. 7A represent different visual properties that do not match. The view hierarchy 1900 includes a third view (ViewUIE3) 1908, which is a subview of the ViewUIE1 1904. A first ViewCONTROLLER 1910 controls the first view (ViewUIE1) 1904. An X ViewCONTROLLER 1912 controls the "X" view (ViewUIEX) 1906. A third ViewCONTROLLER 1914 controls the third view (ViewUIE3) 1908. The first ViewCONTROLLER 1910 also manages the "X" ViewCONTROLLER 1912 and the third ViewCONTROLLER 1914.

FIG. 8B is an illustrative drawing representing an example second application view hierarchy 1920 that is produced at runtime in the course of the running of the application. At the top of the view hierarchy 1920 is a viewWINDOW 1922. The second view hierarchy 1920 includes a first view (ViewUIE1) 1924, which is a subview of the viewWINDOW 1922. The view hierarchy 1920 includes second view (ViewUIE2) 1926, which is a subview of the ViewUIE1 1924. The view hierarchy 1920 includes a third view (ViewUIE3) 1928, which is a subview of the ViewUIE1 1924. The view hierarchy 1920 includes a "Y" view (ViewUIEY) 1929, which is a subview of the ViewUIE1 1924. A first ViewCONTROLLER 1930 controls the first view (ViewUIE1) 1924. A second ViewCONTROLLER 1932 controls the second view (ViewUIE2) 1926. A third ViewCONTROLLER 1934 controls the third view (ViewUIE3) 1928. A "Y" ViewCONTROLLER 1936 controls the "Y" view (ViewUIEY) 1929. The first ViewCONTROLLER 1930 also manages the second ViewCONTROLLER 1932, the third ViewCONTROLLER 1934 and the Y ViewCONTROLLER 1936.

FIG. 8C is an illustrative drawing representing an example third application view hierarchy 1940 that is produced at runtime in the course of the running of the application. At the top of the view hierarchy 1940 is a viewWINDOW 1942. The third view hierarchy 1940 includes a first view (ViewUIE1) 1944, which is a subview of the viewWINDOW 1942. The third view hierarchy 1940 includes third view (ViewUIE3) 1948, which is a subview of the ViewUIE1 1944. The third view hierarchy 1940 includes a second view (ViewUIE2) 1946, which is a subview of the ViewUIE3 1948. A first ViewCONTROLLER 1950 controls the first view (ViewUIE1) 1944. A third ViewCONTROLLER 1952 controls the third view (ViewUIE3) 1948. A second ViewCONTROLLER 1954 controls the second view (ViewUIE2) 1946.

Referring to the first application view hierarchy 1900 of FIG. 8A and to the application subview hierarchy 1750 of FIG. 7B, which acts as a selector, there is a match since an application subview hierarchy 1906 within the application view hierarchy 1900 contains components 1902, 1904 and 1908 that have structural property relationships and visual properties that match corresponding property constraints defined by components 1702, 1704 and 1708 of application/selector subview hierarchy 1750. Specifically, a traversal path from view 1904 to view 1908 proceeds via the second index (1) of view 1904, which matches the traversal path constraint from view 1704 to view 1708 in view selector 1750, which proceeds via the second index (1) of view 1704. Additionally, view 1904 of view hierarchy 1900 includes visual properties "VUIE1" that match the selector visual property constraints "VUIE1" of the first view 1704 of the view selector 1750, and view 1908 of view hierarchy 1900 includes visual properties "VUIE3" that match the selector visual property constraints "VUIE3" of the third view 1708 of the view selector 1750. Accordingly, the view selector 1750 that has view 1708 matches the subview within view hierarchy 1900 that that includes view 1908. In accordance with some embodiments, decision modules 108, 208 determine that the view 1908, which corresponds to the leaf node view of the view selector 1750, is to be modified pursuant to process 100 and or have its usage tracked pursuant to process 200.

Still referring to the first application view hierarchy 1900 of FIG. 8A, the subview containing Window 1902, view 1904 and view 1906 does not match the view selector 1750. In particular, the traversal path that arrives at view 1906 in the view hierarchy 1900 is different from the traversal path constraint in the view selector 1750 that arrives at leaf view 1708. Specifically, a traversal path from view 1904 to view 1906 proceeds via the first index (0) of view 1904, which does not match the traversal path constraint from view 1704 to view 1708, which proceeds via the second index (1) in view selector 1750. Furthermore, the visual properties "VUIEX" of the view 1906 of the view hierarchy 1900 do not match the visual property constraint of the view 1708 of the view selector 1750.

Referring now to second view hierarchy 1920 of FIG. 8B and to the view selector 1750 of FIG. 7B, there is no match. In particular, although the selector visual property constraints of the component views 1702, 1704 and 1708 of the application/selector subview hierarchy 1750 match the visual properties of component views 1922, 1924 and 1928 of view hierarchy 1920, their structural properties do not match. More specifically, in the application/selector view hierarchy 1750 of FIG. 7B, view property constraint 1708 is associated with the second index (1) of view property constraint 1704, but in the view hierarchy 1920 of FIG. 8B view 1928 is associated with a third index labeled (2) of view 1924. Accordingly, decision modules 108 and 208 determine that no view of the second view hierarchy 1920 need be modified or tracked.

Referring to third application view hierarchy 1940 of FIG. 8C and to the view application/selector 1750 of FIG. 7B, there is no match. Even though components 1942, 1944 and 1948 of the third view hierarchy 1940 have visual properties that match those of respective property constraints 1702, 1704 and 1708 of the application/selector subview hierarchy 1750, the structural relationships among them do not match. More specifically, in the selector view hierarchy 1750 of FIG. 7B, view property constraint 1708 is associated with the second index (1) of view property constraint 1704, but in the view hierarchy 1940 of FIG. 8C, view 1948 is associated with the first index labeled (0) of view 1944. Accordingly, decision modules 108 and 208 determine that no view of the third view hierarchy 1940 need be modified or tracked.

Second Example View Selector Match Determinations

Figures 9A, 10A:
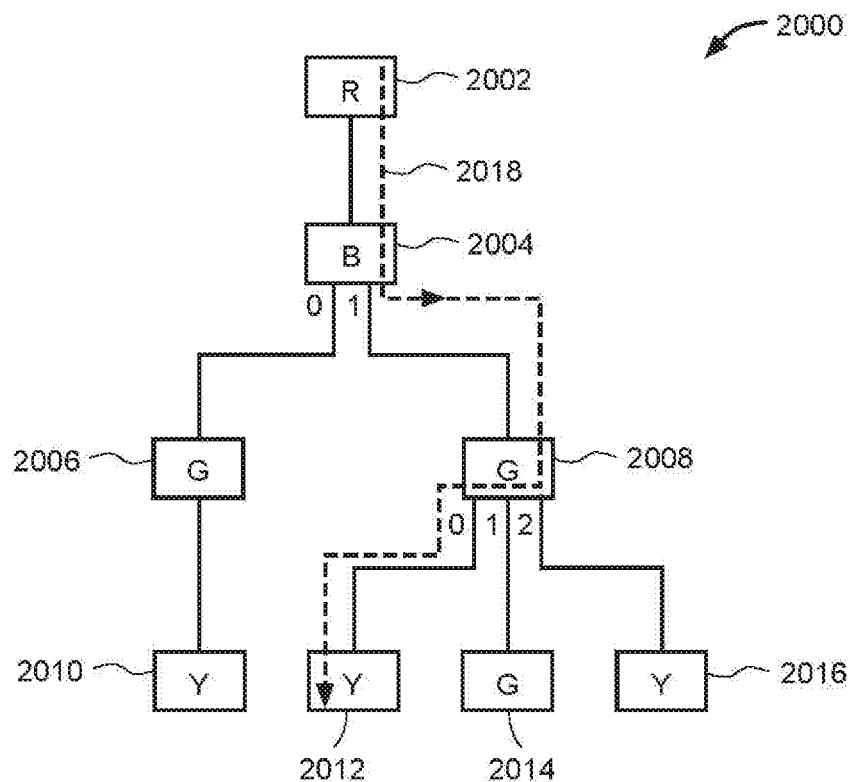
FIG. 9A is an illustrative drawing representing an example application view hierarchy showing a first traversal path in accordance with some embodiments.
FIG. 10A is an illustrative drawing representing a first selector information structure defined based upon the view hierarchy of FIG. 9A in accordance with some embodiments.
Figures 9B, 10B:
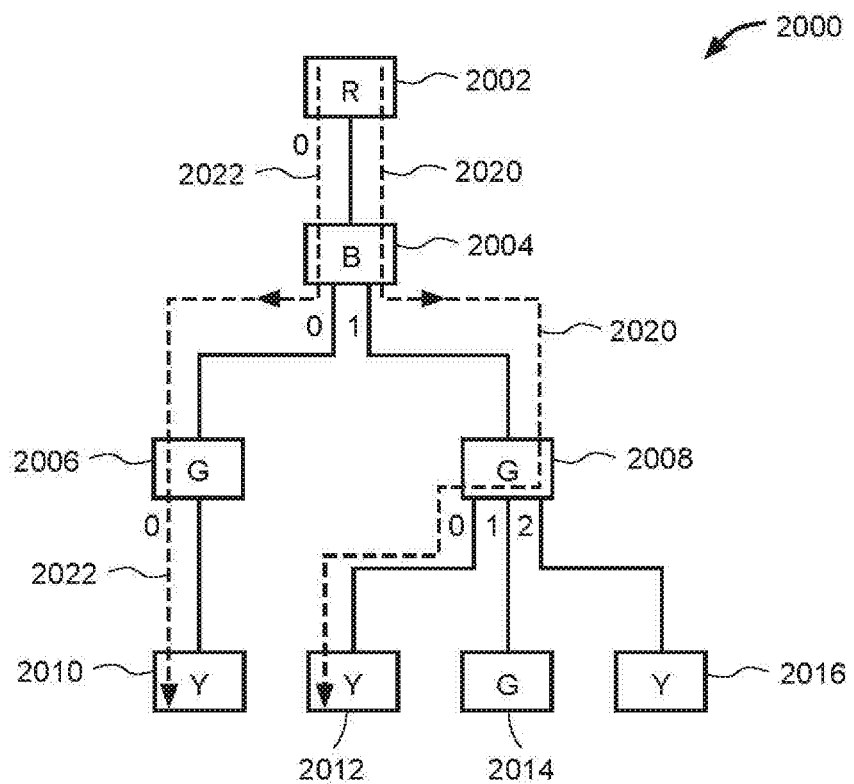
FIG. 9B is an illustrative drawing representing an example application view hierarchy of FIG. 9A showing the first traversal path and a second traversal path in accordance with some embodiments.
FIG. 10B is an illustrative drawing representing a second selector information structure defined based upon the view hierarchy of FIG. 9A in accordance with some embodiments.
Figures 9C, 10C:
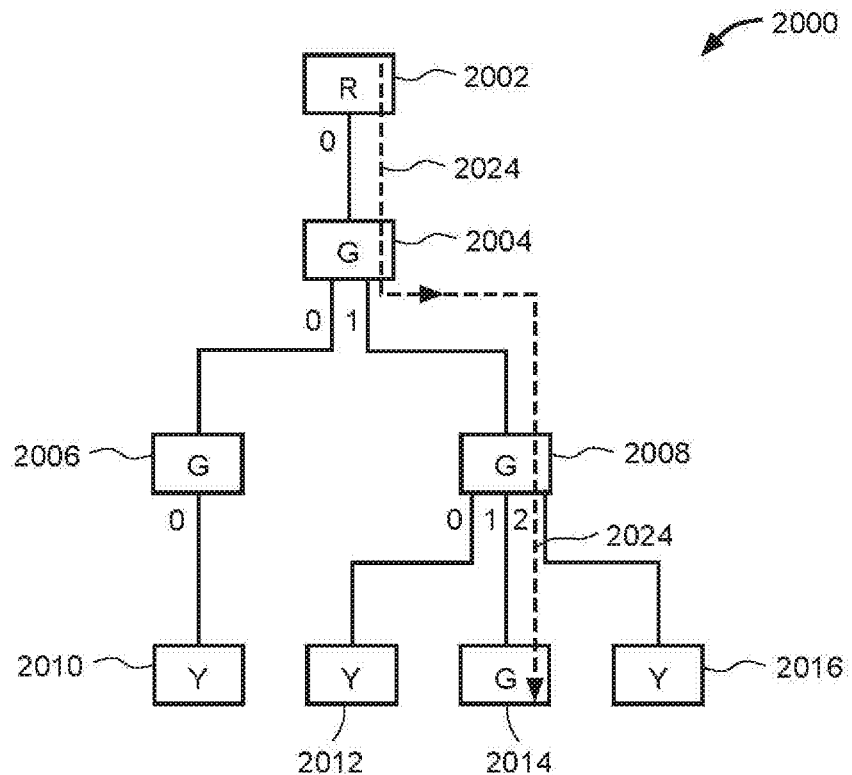
FIG. 9C is an illustrative drawing representing an example application view hierarchy of FIG. 9A showing a third traversal path in accordance with some embodiments.
FIG. 10C is an illustrative drawing representing a third selector information structure defined based upon the view hierarchy of FIG. 9A in accordance with some embodiments.

In accordance with some embodiments, property constraints associated with a subview hierarchy that is used to act as a view selector can be weakened so that the view selector can match a wider range of views used in a view hierarchy. FIGS. 9A-9C are illustrative drawings showing the same illustrative example view hierarchy, which includes views 2002-2016 labeled to indicate their visual color properties: R (red), B (blue), G (green) and Y (yellow). FIG. 9A shows the application view hierarchy 2000 labeled to show a second traversal path 2018. FIG. 9B shows the application view hierarchy 2000 labeled to show the second traversal path 2020 and a third traversal path 2022. FIG. 9C shows the application view hierarchy 2000 labeled to show a fourth traversal path 2024.

FIG. 10A is an illustrative drawing representing a first selector view information structure 2101 defined based upon the view hierarchy 2000. FIG. 10B is an illustrative drawing representing a second view selector information structure 2102 defined based upon the view hierarchy 2000. The second view selector information structure 2102 sets forth fewer constraints, and therefore, can be used to identify a larger number of views in a view hierarchy (not shown) to be modified and/or tracked. FIG. 10C is an illustrative drawing representing a third view selector information structure 2103 defined based upon the view hierarchy 2000. The third view selector information structure 2103 sets forth different combination of color constraints than the first and second structures 2101, 2102.

The first view selector information structure 2101 of FIG. 10A represents a selector subview hierarchy, indicated in FIG. 9A by the views (2002, 2004, 2008, 2012) that are intersected by dashed lines 2018, which represents a first traversal path. The first view selector information structure 2101 (also referred to as the "first view structure 2101") is a representation of the subview hierarchy indicated by dashed lines 2018. A first row of the first view structure 2101 corresponds to view 2002 and indicates that the selector view color property constraint is R and the selector view structure property constraint is the first index (0), which indicates a subview relationship with a selector view color property constraint corresponding to view 2004. A second row of the first view structure 2101 corresponds to view 2004 and indicates that the selector view color property constraint is B and the selector view structure property constraint is the second index (1), which indicates a subview relationship with a selector view color property constraint corresponding to view 2008. A third row of the first view structure 2101 corresponds to view 2008 and indicates that the selector view color property constraint is G and the selector view structure property constraint is index (0), which indicates a subview relationship with a selector view color property constraint corresponding to view 2012, and indicates that the selector view color property constraint is Y. Since view 2012 is a leaf node view, its structure property constraint is "blank", i.e. "don't care". Thus, the first view structure 2101 corresponds to a first traversal path represented by dashed lines 2018 in FIG. 9A that proceeds from view 2002 followed by view 2004 followed by view 2008 followed by view 2012. The decision modules 108 and 208 can use the first view structure 2101 to identify a view that corresponds to the leaf node view 2012 that is to be modified and/or tracked.

FIG. 10B is an illustrative drawing representing a second view selector information structure 2102 defined based upon the view hierarchy 2000. The second view selector information structure 2102 (also referred to as the "second view structure 2102") is stored in a computer readable storage device. As explained below, the second view structure 2102 can be used to determine whether a view hierarchy (not shown) includes views that match two views 2010 and 2012.

The second view selector information structure 2102 of FIG. 10B represents a subview hierarchy, indicated in FIG. 9B by the combinations of views (2002, 2004, 2006, 2010) and (2002, 2004, 2008, 2012) respectively intersected by dashed lines 2020 and 2022, which represents a second and third traversal paths. The second view selector information structure 2102 (also referred to as the "second view structure 2102") is a representation of the selector subview hierarchy indicated by dashed lines 2020 and 2022. A first row of the second view structure 2102, which corresponds to view 2002, indicates that the selector view color property constraint is R and the selector view structure property constraint is index (0), which indicates a subview relationship with a selector view color property constraint corresponding to view 2004. The first row, therefore, constrains the second view structure 2102 to match the color property of view 2002 and to follow the respective second and third traversal paths 2020 and 2022, which are contiguous at this point, via index (0). A second row of the second view structure 2102, which corresponds to view 2004, indicates that the selector view color property constraint is B and the view structure property constraint is "blank", i.e. "don't care". In accordance with some embodiments, the designation "blank" indicates that no structure property is specified, and therefore, that no structural property constraint is defined to limit traversal paths flowing from view 2004. In other words, this constraint is a "don't care". The second row of the second view structure 2102, therefore, constrains the second view structure 2102 to find a match the color property of view 2004. However, the second row of the second view structure 2102 does not provide a structure property constraint. In the absence of a structural constraint (i.e. in the presence of a "don't care"), the visual property constraint that corresponds to view 2004 has a subview relationship with every selector view color property constraint that corresponds to view 2004. Since the view 2004 has subview relationships with two subviews, 2006, 2008, two traversal paths emerge from the selector view color property constraint that corresponds to view 2004: the third traversal path 2022 flows to a visual property constraint that corresponds to view 2006 and a second traversal path 2020 flows to a visual property constraint that corresponds to view 2008. Thus, the "don't care" structural property constraint of the second row of the second view structure 2102 constrains the second view structure 2102 to find a color match to both view 2006 on the third traversal path 2022 and view 2008 on the second traversal path 2020. A third row of the second view structure 2102, which corresponds to views 2006 and 2008, indicates that the selector view color property constraint is G and the selector view structure property constraint is index (0), which for the view color constraint that corresponds to view 2006, indicates a subview relationship with a selector view color property constraint corresponding to view 2010; and which for the view color constraint that corresponds to view 2008, indicates a subview relationship with a selector view color property constraint corresponding to view 2012. A fourth row of the second view structure 2102, which corresponds to views 2010 and 2012, indicates that the selector view color property constraint is Y and the selector view structure property constraint is blank, "don't care." The fourth row of the second view structure 2102, therefore, constrains the second view structure 2102 to find a color match to both view 2010 on the third traversal path 2022 and to view 2012 on the second traversal path 2020.

Thus, the second selector view hierarchy information structure 2102 defines the third traversal path 2022 that includes constraints that correspond to view 2002 followed by constraints that correspond to view 2004 followed by constraints that correspond to view 2006 followed by constraints that correspond to view 2010. The second view hierarchy information structure 2102 also defines the second traversal path 2020 that includes constraints that correspond to view 2002 followed by constraints that correspond to view 2004 followed by constraints that correspond to view 2008 followed by constraints that correspond to view 2012. Decision modules 108 and/or 208 use the third traversal path 2022 defined by the second view structure 2102 to determine whether there is a view in a runtime view hierarchy (not shown) that corresponds to view 2010 that is to be modified and/or tracked. Decision modules 108 and/or 208 use the second traversal path 2020 defined by the second view structure 2102 to determine whether there is a view in a runtime view hierarchy (not shown) that corresponds to view 2012 that is to be modified and/or tracked. In accordance with some embodiments, a match is determined in response to a view hierarchy matching of both the second and third traversal paths 2020, 2022.

FIG. 10C is an illustrative drawing representing a third selector view information structure 2103 defined based upon the view hierarchy 2000. The third view selector information structure 2103 (also referred to as the "third view structure 2103") is stored in a computer readable storage device. As explained below, the third view structure 2103 can be used to determine whether a view hierarchy (not shown) includes a view that matches view 2014. The third view selector information structure 2103 of FIG. 10C represents a sub-view hierarchy, indicated in FIG. 9C by the views (2002, 2004, 2008, 2014) that are intersected by dashed line 2024, which represents a fourth traversal path. The third view selector information structure 2103 (also referred to as the "third view structure 2103") is a representation of the subview hierarchy indicated by dashed lines 2024. A first row of the third view structure 2103, which corresponds to view 2002, indicates that the selector view color property constraint is R and the view structure property constraint is index (0), which indicates a subview relationship with a selector view color property constraint corresponding to view 2004. A second row of the third view structure 2103, which corresponds to view 2004, indicates that the selector view color property constraint is B and the view structure property constraint is index (1), which indicates a subview relationship with a selector view color property constraint corresponding to view 2008. A third row of the third view structure 2103 indicates that the selector view color property constraint is G and the selector view structure property constraint is blank, "don't care". In the absence of a structural constraint (i.e. in the presence of a "don't care"), the visual property constraint that corresponds to view 2008 has potential subview relationships with every selector view color property constraint that corresponds to view 2004. Since the view 2008 has subview relationships with three subviews, 2012, 2014 and 2016, three potential traversal paths emerge from the selector view color property constraint that corresponds to view 2008. However, only the traversal path corresponding to index (1) corresponds to a view (view 2014) that has a visual property value that matches a visual property constraint (Green) specified in the third row of the third view structure 2103. Thus, only one path emerges from the visual property constraint corresponding to view 2008 despite there being three possible paths due to the "don't care" structural property constraint. A fourth row of the third view structure 2103, which corresponds to view 2014, indicates that the selector view color property constraint is G and the selector view structure property constraint is blank. Thus, the third view structure 2103 defines the fourth traversal path 2024 that includes constraints that correspond to view 2002 followed by constraints that correspond to view 2004 followed by constraints that correspond to view 2008 followed by constraints that correspond to view 2014. Decision modules 108 and/or 208 use the fourth traversal path 2024 defined by the third view structure 2103 to determine whether there is a view in a runtime view hierarchy (not shown) that corresponds to view 2014 that is to be modified and/or tracked.

Persons of ordinary skill in the art will appreciate that although the illustrative example first, second and third view structures 2101, 2102 and 2103 designate traversal paths in terms of specific indexes, e.g., (0), (1), (2), it is also possible to designate traversal paths in more qualitative terms such as the path that traverses the largest number of view having the color property blue, for example.

The following are a few illustrative examples of other possible constraints that can be used in a selector in accordance with some embodiments. A constraint may depend upon properties of an element in a traversal path. For example, an element X might be determined to match only if, somewhere in the view hierarchy, there is a view displaying the label "Price", and this label is configured to render to the left of X. A constraint may involve comparing or quantifying properties over several views. For example, the above "most blue elements" example is in the spirit of this. Another example is choosing a view that takes up the most space on the screen. Constraints also may involve more complicated checks on visual properties. For example, a selection may be made on an element only if a spam filtering algorithm determines that its text is likely spam.

System to Develop Application Modifications and Selectors

Figure 11:
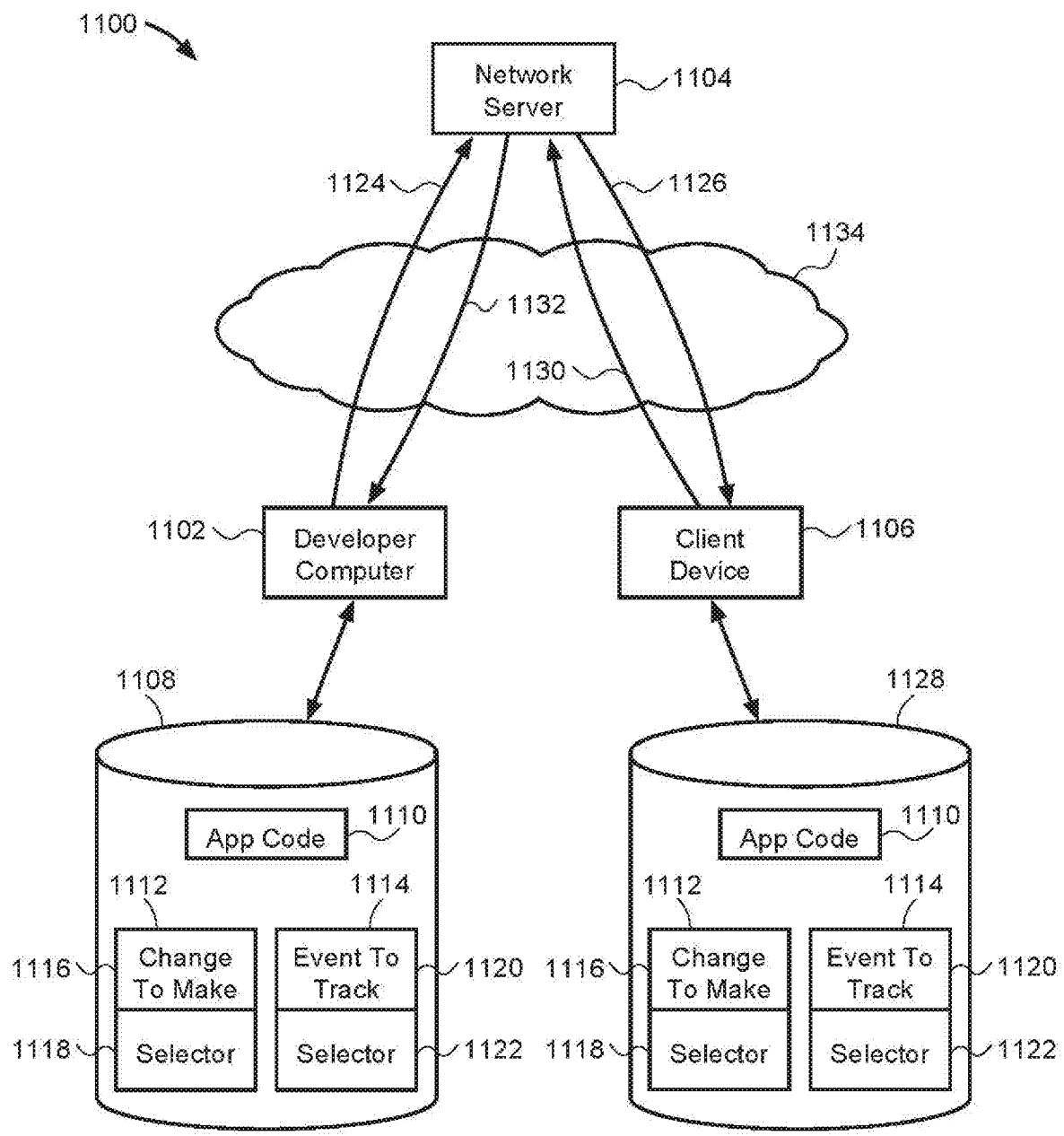
FIG. 11 is an illustrative functional block diagram representing a system and its operation in developing information structures for use to dynamically change a user interface of a computer program code application running on a wireless device in accordance with some embodiments.

FIG. 11 is an illustrative functional block diagram representing a system 1100 and its operation in developing information structures for use to dynamically change a user interface of a computer program code application running on a wireless device in accordance with some embodiments. The system 1100 includes a developer computer 1102, a network communications server 1104 and a client device 1106. The developer computer is operatively coupled to a computer readable first storage device 1108 that stores the application 1110. In some embodiments, the client device 1106 can be a wireless communication device that can run the application. The network communications server 1104 provides network communication services to the developer computer 1102 and the client device 1106 so that they can communicate during development. In some embodiments, the client device is capable of wirelessly downloading of the application 1110 from the server 1104.

In operation, the developer computer 1102 is used to create first and second information structures 1112, 1114, sometimes referred to as "metadata", that are stored in the first storage device 1108. The first information structure 1112 includes an modification information 1116 used by an instance of the application 1110 running on the client device 1106. The first information structure also includes a view selector information 1118 used to select a view to be modified. The first information structure 1112 associates the indication of a modification 1116 with the selector information 1118. The second information structure 1114 includes an event tracking indication 1120 that indicates an application event to track. The second information structure 1114 also includes view selector 1122 used to select a view associated with an event to track. The second information structure 1114 associates the tracking indication 1120 with the selector information 1122.

In operation, the developer computer 1102 runs the application 1110 while a developer (not shown) enters information to create the first and second information structures 1112, 1114. Example details of the entry of information to create the information structures 1112, 1114 and example information structures are discussed below with reference to Examples 1 and 2 and FIGS. 15A-17C. As indicated by the arrow 1124, the computer 1102 transmits the information structures 1112, 1114 to the server 1104. As indicated by arrow 1126, the server 1104, in turn, transmits the information structures 1112, 1114 to the client device 1106. The transmissions 1124, 1126 may involve communications over a wireless network in order to test the effectiveness of wireless delivery of the information structures 1112, 1114.

The client device is operatively coupled to a computer readable second storage device 1128 that stores an instance of the application 1110 and the received copies of the first and second information structures 1112, 1114. The client device 1106 uses the first and second information structures to implement changes to and tracking of the application 1110. Details of processes to make changes and implement tracking are discussed below with reference to FIGS. 2-3. As indicated by arrow 1130, the client device 1106 transmits to the server 1104 one or more screen captures of the user interface as modified using the information structure 1112. As indicated by arrow 1132, the server, in turn sends the screen captures to the developer computer 1102 so that the developer can evaluate whether or not changes are satisfactory.

System to Deliver Application Modifications and Selectors and Track Usage

Figure 12:
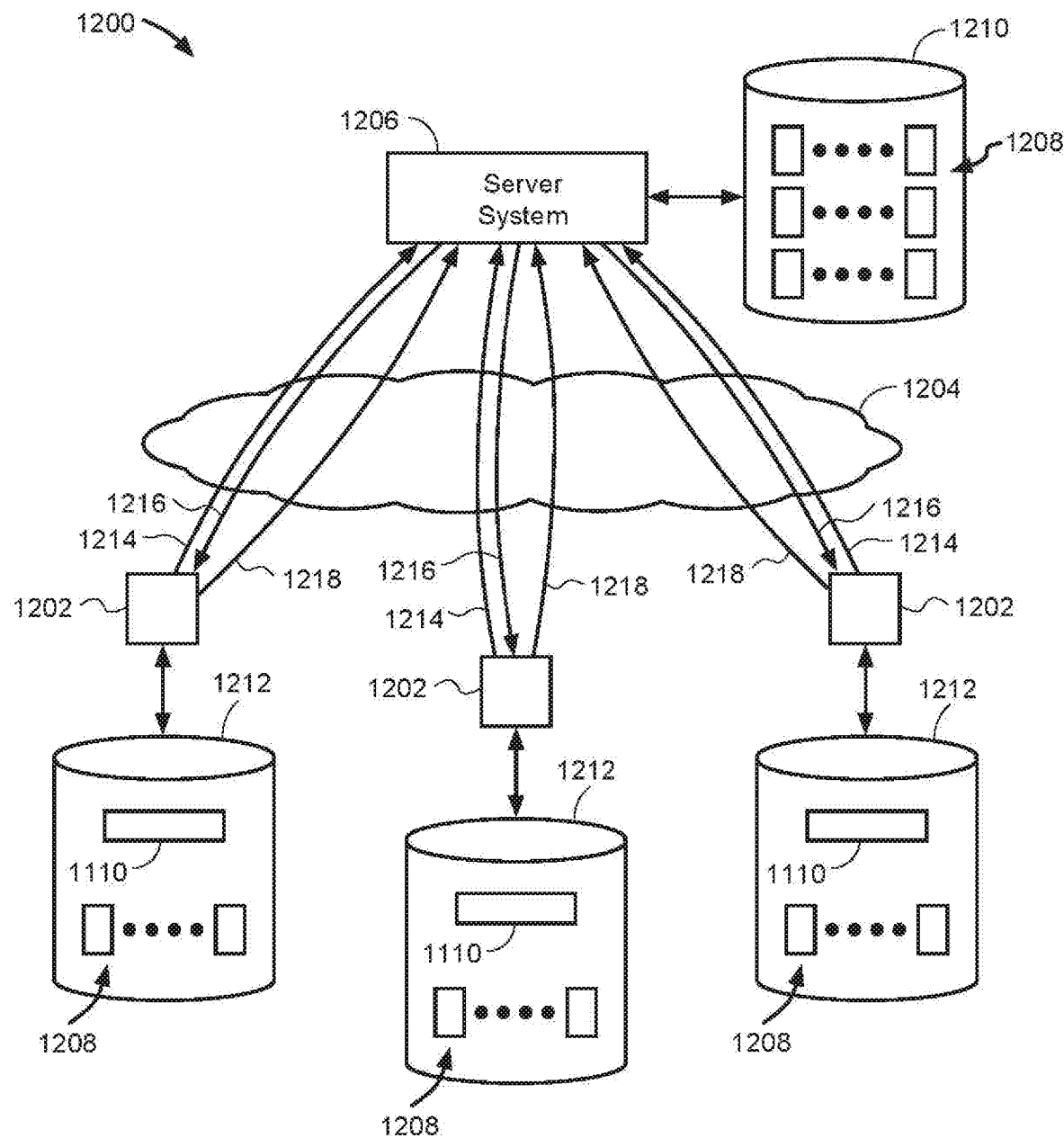
FIG. 12 is a generalized block diagram representing a system for delivery, modification and tracking of applications that run on wireless devices in accordance with some embodiments.

FIG. 12 is a generalized block diagram representing a system 1200 that includes a plurality of user devices 1202 that run the computer program code application 1110 that can be operatively coupled via a network 1204 with a server system 1206 that can transmit information structures 1208 to the devices 1202 and that can receive tracking information from the devices 1202. The server system 1206 acts as a monitoring system to receive messages from user devices 1202 indicating use of certain application subview hierarchies to generate user interface displays. More specifically, the server system 1206 is operatively coupled to a storage device 1210 that stores a plurality of information structures that can be created using the system 1100 of FIG. 11, for example. Each respective device includes storage 1212 that can store the application 1110 that can run on the device and that can store metadata that includes one or more information structures 1208. It will be appreciated that there can be many different information structures to implement different changes and different tracking, for example.

In operation, the application running on a given device 1202 periodically configures its device 1202 to transmit a request indicated by arrows 1214 to the server system 1206 to request information structure updates. In response, the server system 1206 transmits to the device 1202 one or more information structures as indicated by arrows 1216. The devices 1202 implement the processes of FIGS. 2-3, for example. The devices periodically transmit to the server system 1206 tracking information as indicated by arrows 1218.

Developer UI and Process to Create Modification Information and View Selectors

Figure 13:
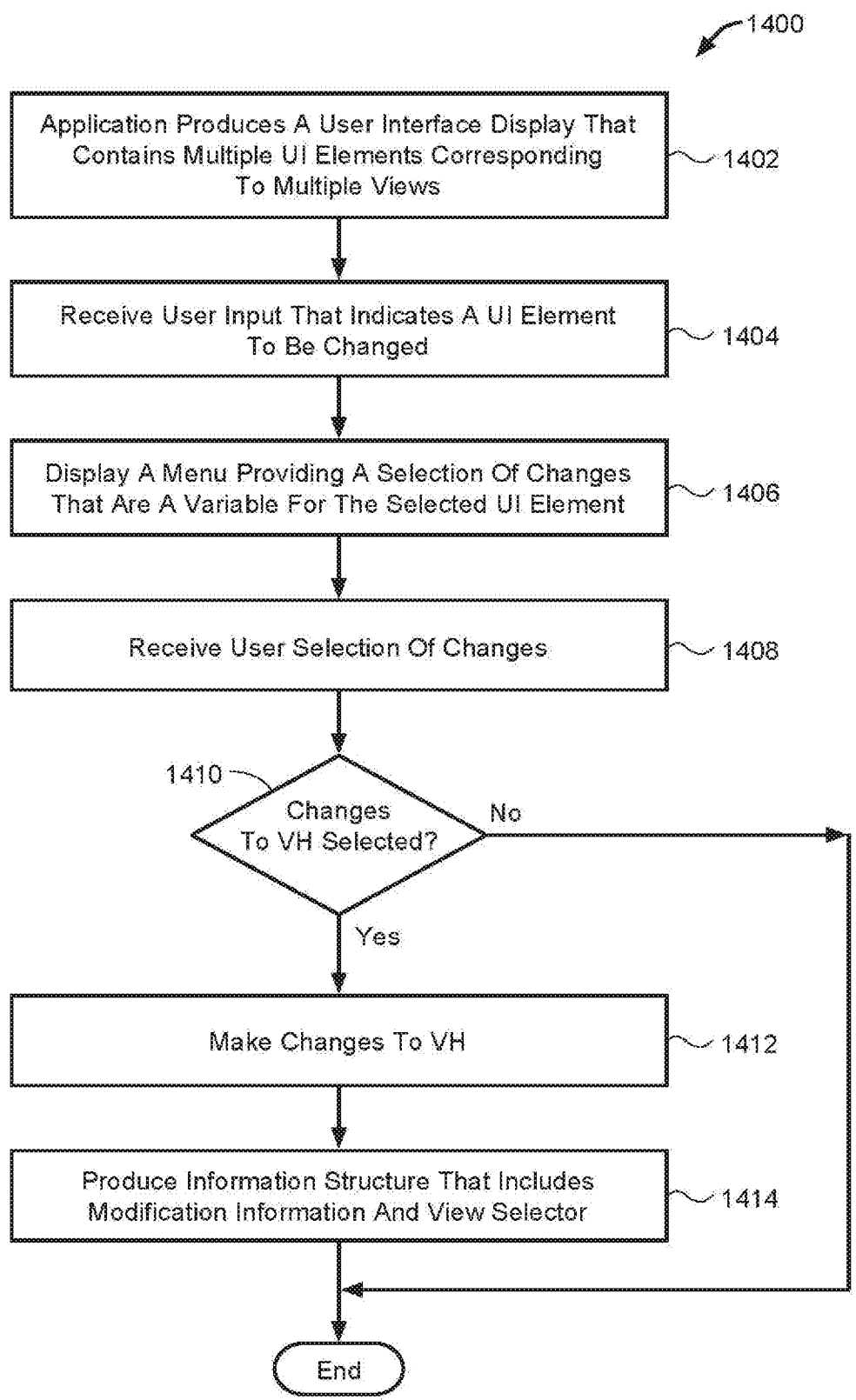
FIG. 13 is illustrative flow diagram representing a process to create an information structure for use to configure a user device that runs an application to modify a view hierarchy used by the application to produce a user interface, in accordance with some embodiments.
Figure 14:
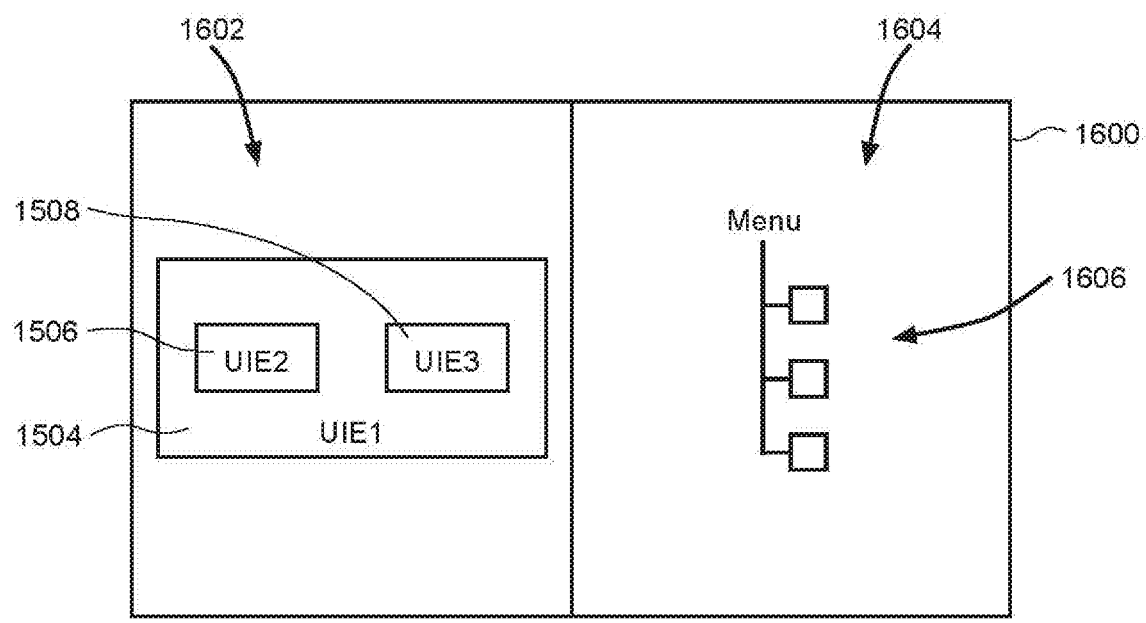
FIG. 14 is an illustrative drawing of an example developer system user interface screen display produced in the course of an example run of the process of FIG. 13 in accordance with some embodiments.

FIG. 13 is illustrative flow diagram representing a process 1400 to create an information structure for use to configure a user device that runs an application to modify a view hierarchy used by the application to produce a user interface, in accordance with some embodiments. Module 1402 configures a developer computer, discussed with reference to FIG. 11, to use the application to produce the example user interface screen display 1500 of FIG. 6. Module 1404 configures the developer computer to receive developer input indicating a user interface element from the user interface screen display 1500 that is to be changed. In response to the input, module 1406 produces a developer system user interface screen display that indicates a menu of changes that can be made to a view that corresponds to a selected user interface element. Assume, for example, that module 1404 receives developer input that indicates that the UIE3 1508 is chosen for modification. In response to the example input, module 1406 generates the example developer system user interface screen display 1600 of FIG. 14. The screen display 1600 includes a left-side region 1602 that shows the UI display 1500 in which the selected third user interface element 1508, which is to be modified, is displayed highlighted. The screen display 1600 includes a right-side region 1604 that shows a property change menu display 1606 that user interface elements to receive changes to be made to the view 1708, shown in FIG. 7A, used to produce the selected third user interface element 1508. Module 1408 configures the developer computer to receive developer input to the property change menu display indicating changes to make to the selected UIE3 1508. Decision module 1410 determines whether the inputted changes include input that indicates a change to the view 1708 that corresponds to the selected user interface element UIE3 1508. In response to a determination by decision module 1410 that the developer input indicates a change to the view 1708, module 1412 generates modification information that can be used to make the indicated change. Module 1414 generates and stores in a non-transitory computer readable storage device an information structure that associates the modification information with a copy of the subview hierarchy, such as subview hierarchy 1750 that identifies view 1708, and the process 1400 ends. Also, in response to a determination by decision module 1410 that the developer input indicates that no change is to be made to the corresponding view 1708, the process 1400 ends.

Example 1—Details of Example User Interface and Information Structure Code Creation FIGS. 15A-15E are illustrative drawings representing a sequence of developer system user interface screen displays used to designate a first change in an application user interface of a device in accordance with some embodiments. FIG. 15F is an illustrative drawing representing a developer system user interface screen displays used designate a first event related to the first change in the application user interface of a device in accordance with some embodiments. FIGS. 16A1-16A2 and FIGS. 16B1-16B2 are illustrative drawings representing an example first information structure and an example second information structures stored in a computer readable storage device that are created in response to user input provided in connection with the example screen displays of FIGS. 15A-15F. In accordance with some embodiments, the first and second information structures are provided in a json file format. FIG. 16A1-16A2 shows an illustrative first example information structure that indicates a change to be made to a view hierarchy and that provides a first selector used to identify a view hierarchy to which the change is to be applied. FIGS. 16B1-16B2 shows an illustrative second example information structure that indicates an event to be tracked and that provides a second selector used to identify a view hierarchy to in which an event is to be tracked.

Figure 15A:
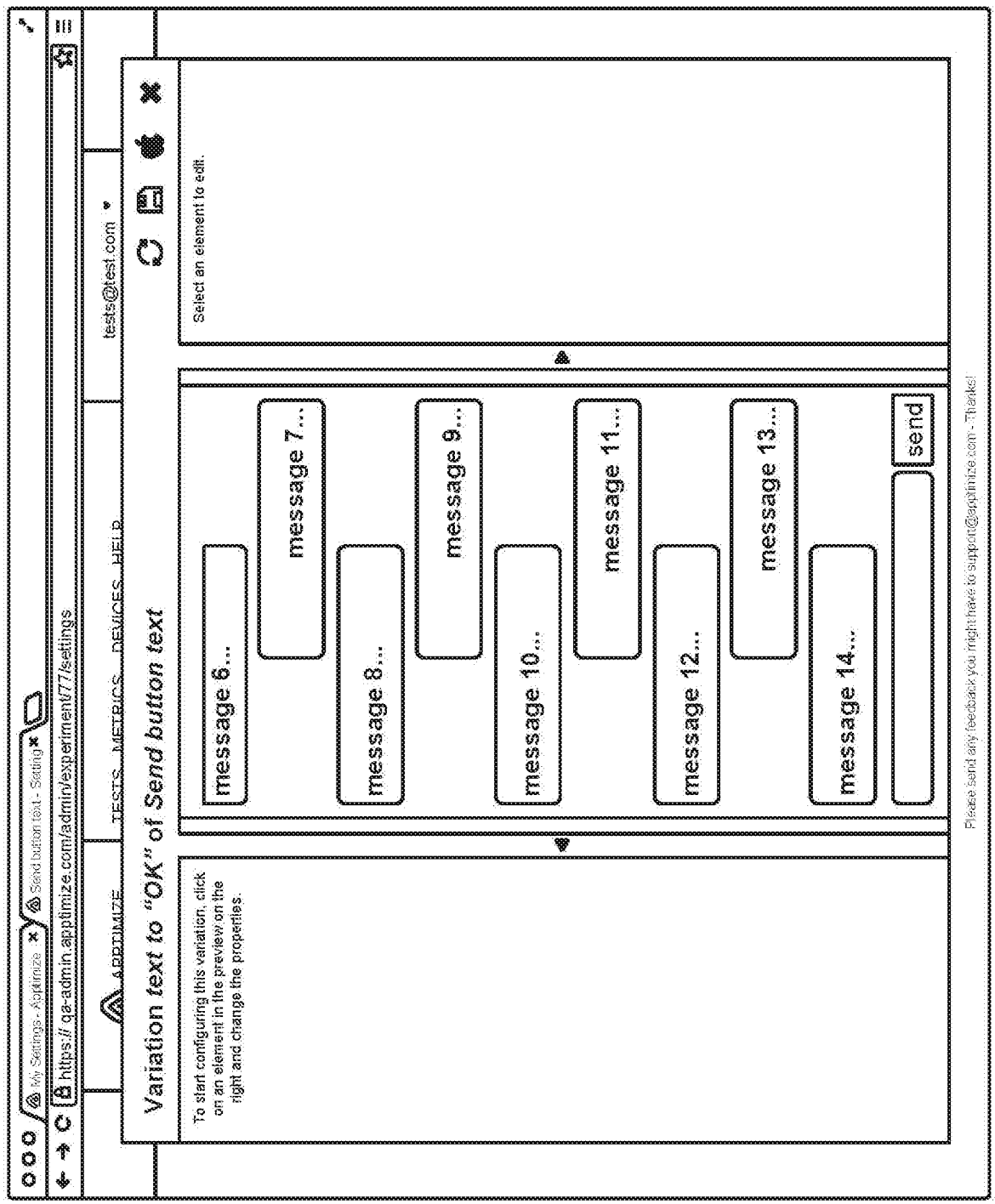
Figures 1, 16B:
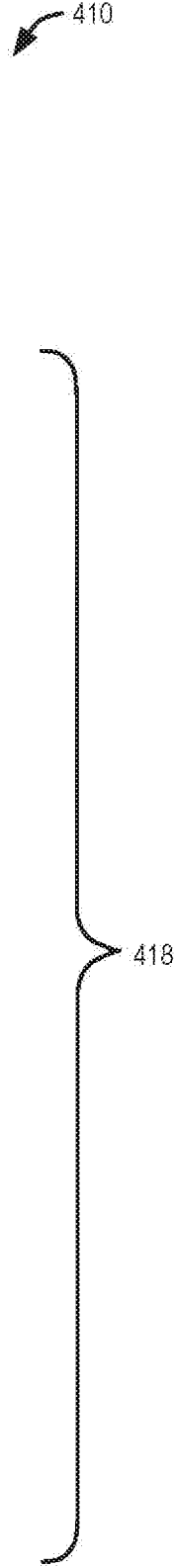

FIG. 15A is an illustrative drawing showing a developer system first user interface screen display with three fields that is produced on a developer computer system. A center field shows an application user interface display generated using a view hierarchy (not shown) generated using an application that is to be modified and tracked. In this example, the application user interface includes an illustrative thread of text chat bubbles containing example text messages, message 6 to message 14. The user interface also includes an application user interface element in the form of a control button labeled "Send". A left-side field and a right side field of the developer system user interface include some basic instruction for configuring a change to the portion of an application user interface shown in the center field.

It will be appreciated that the portion of an application user interface shown in the center field of FIG. 15A corresponds to a view hierarchy (not shown) that is generated by a computer program code application, and that the view hierarchy is used to actually generate that interface portion on the developer system. During the display of the interface portion on the developer system, the view hierarchy used to generate the interface portion is accessible in a computer readable storage device of the developer system. The view hierarchy can be accessed and modifications to the interface portion can be specified and associated with a selector, as explained below with reference to FIGS. 15B-15E. Subsequently, an instance of the same view hierarchy may be generated by an application running on a client device. A selector produced as explained below with reference to FIGS. 15B-15E can be delivered to the client device and can be used in a comparison process described above with reference to FIGS. 2-3, for example, to determine when the view hierarchy used to produce the interface portion shown in FIG. 15A is generated on the client device, so that the modifications specified using the developer system can be made to the view hierarchy generated on the client device so as to as to make corresponding changes to its application user interface.

Figure 15B:
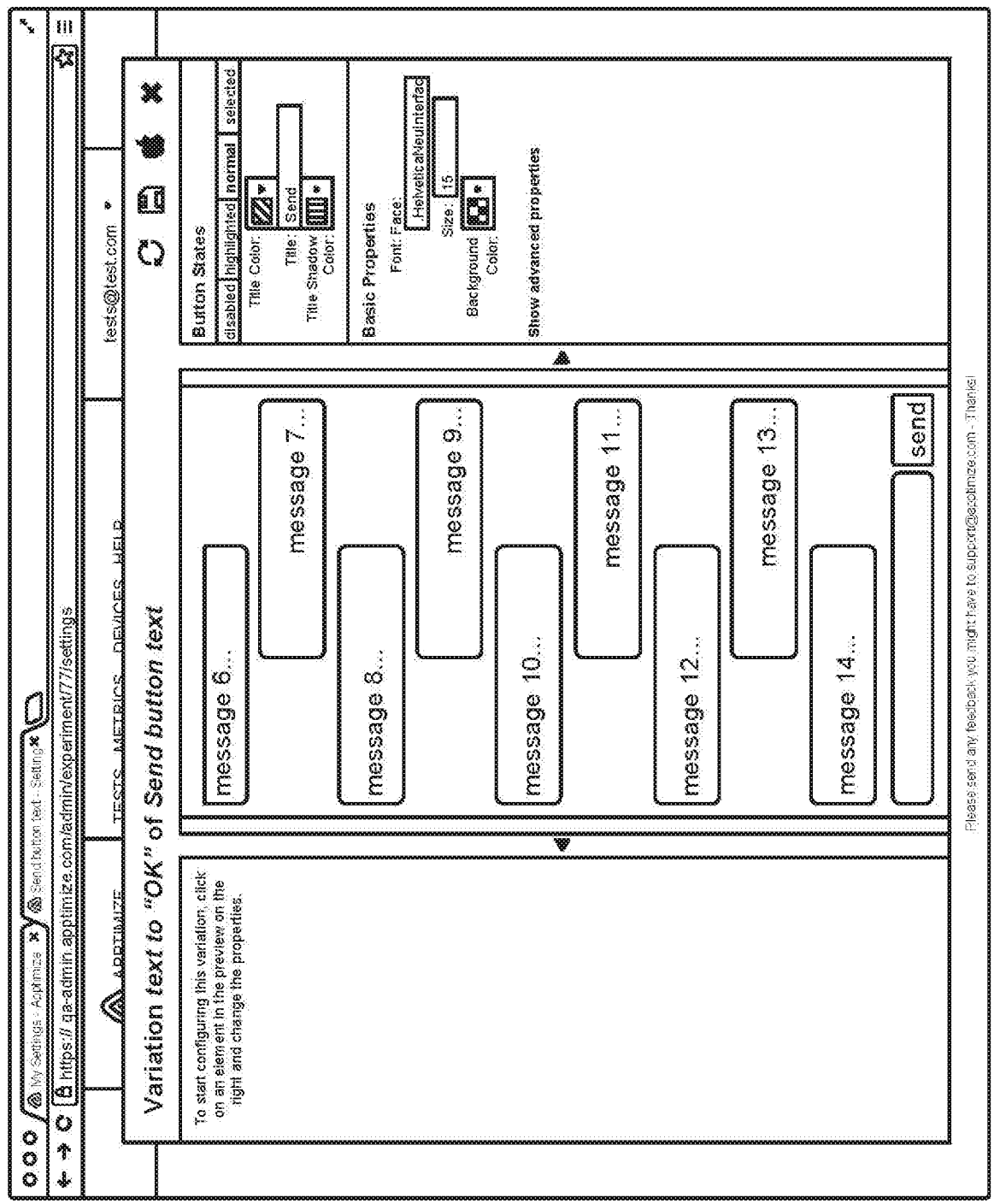

FIG. 15B is an illustrative drawing showing a second developer user interface screen produced on a developer system in response to a developer selecting an application user interface element for modification. In response to the developer's selection of the Send button, the center field shows the non-selected user interface elements, the chat bubbles and their text, greyed or dimmed so that the Send button shows or stands out as if highlighted. Also in response to the developer's selection of the Send button, the right column is changed to provide a property change menu display with a heading, "Button States" and a menu of button property selectors that can be adjusted to change button properties, which in this example, are title color, title shadow, font face, font size and background color. The property values shown in FIG. 15B are the properties of the selected button as it exists in the application prior to entry of any changes by the developer. For example, in the screen of FIG. 15B, the text, "Send" appears in the text property field of the menu.

Still referring to the developer system user interface screen of FIG. 15B, the menu also includes a selection field, "Show advanced properties", that a developer can select to display an expanded menu (not shown) of button properties that can be changed. The right-side menu also includes four button state selection fields, "disabled", "highlighted", "normal" and "selected". In this example, the "normal" button state is selected. A like menu of button property selectors is provided for each state by selecting the appropriate field. For example, selecting the "highlighted" field provides the menu for the button in the "highlighted" state. A developer, for example, might select the title color red for the button in the "highlighted" state and select the title color green for the button in the "normal" state.

Figure 15C:
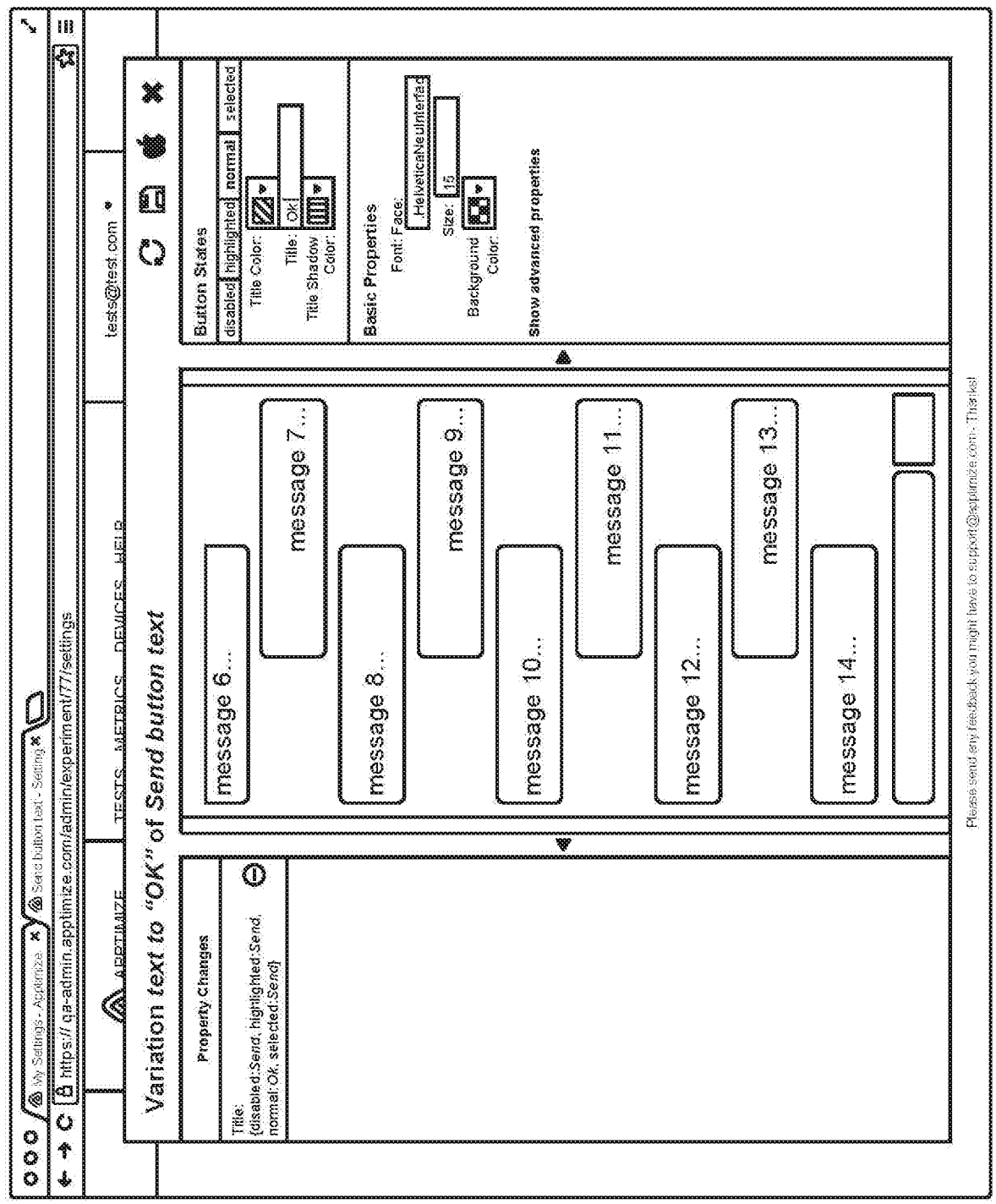

FIG. 15C is an illustrative drawing showing a third user interface screen produced in a developer system in response to a developer replacing the text "Send" in the text property field in the "normal" state with the text, "Ok". It is noted that the center field shows all text removed from the selected button. The left-side field identifies the property changes. In this screen example, the left-side screen indicates that in the "disabled", "highlighted" and "selected" states, the text property is, "Send". In the "normal" state, the text property is "Ok".

Figure 15D:
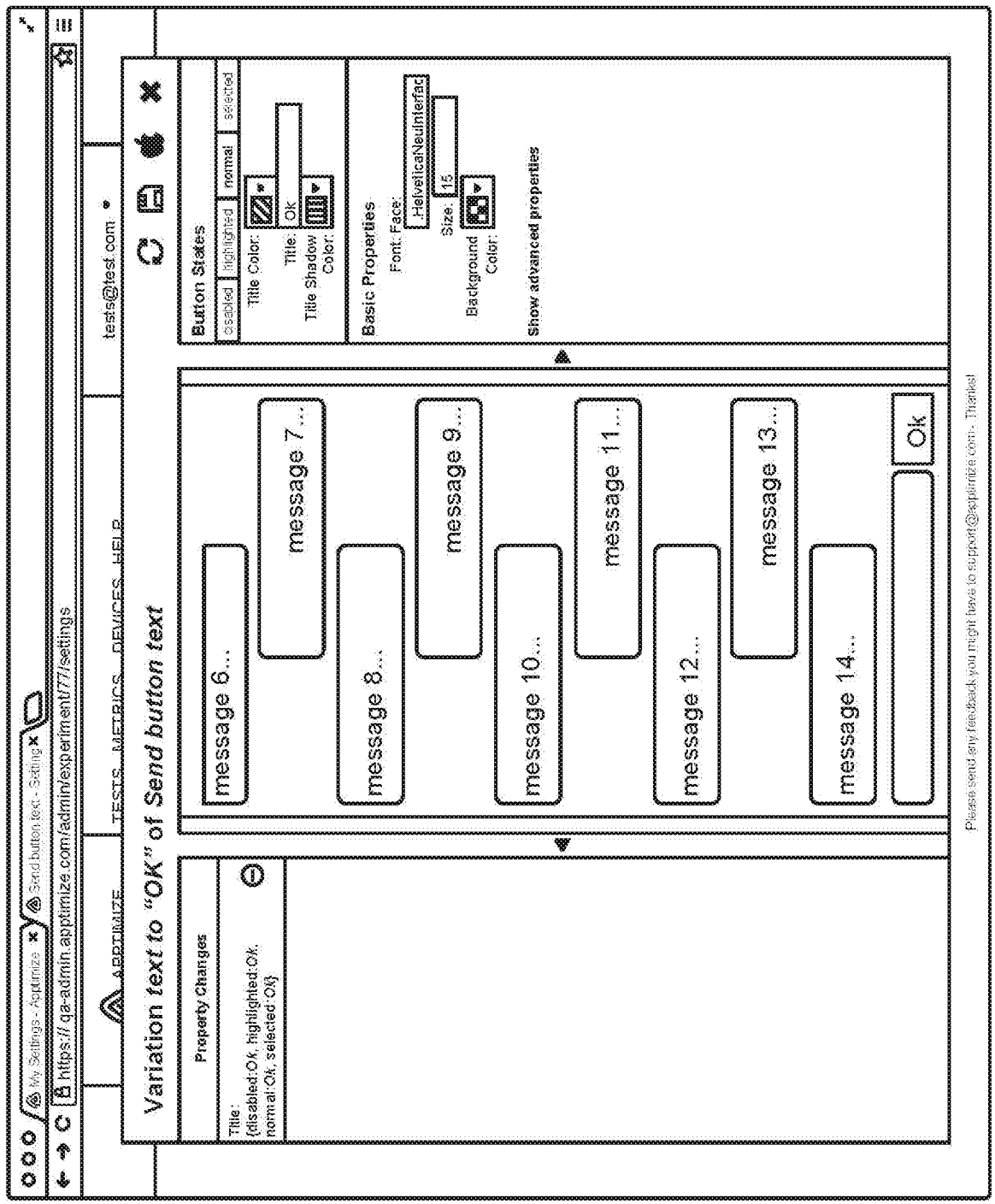
Figure 15E:
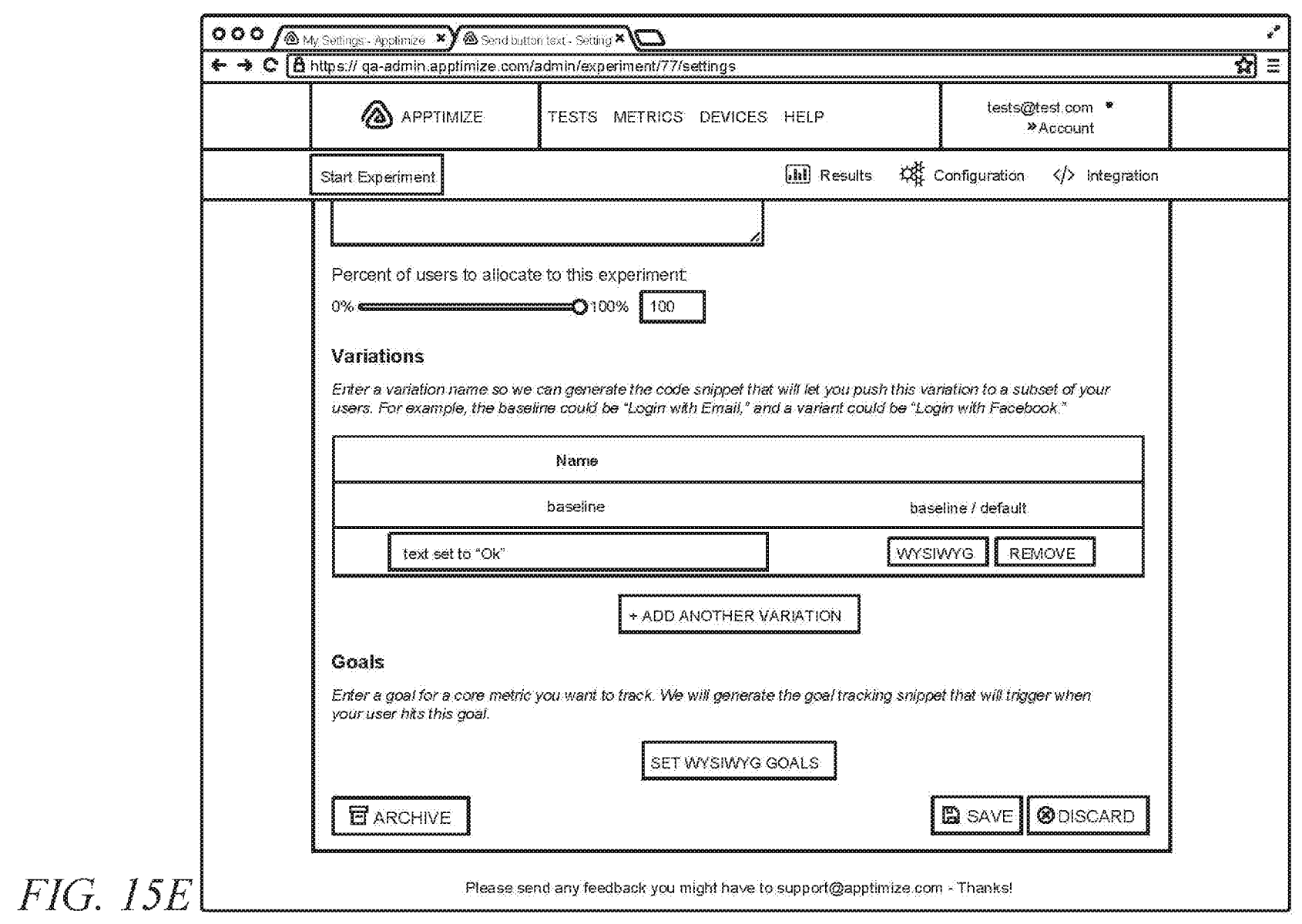
Figure 15F:
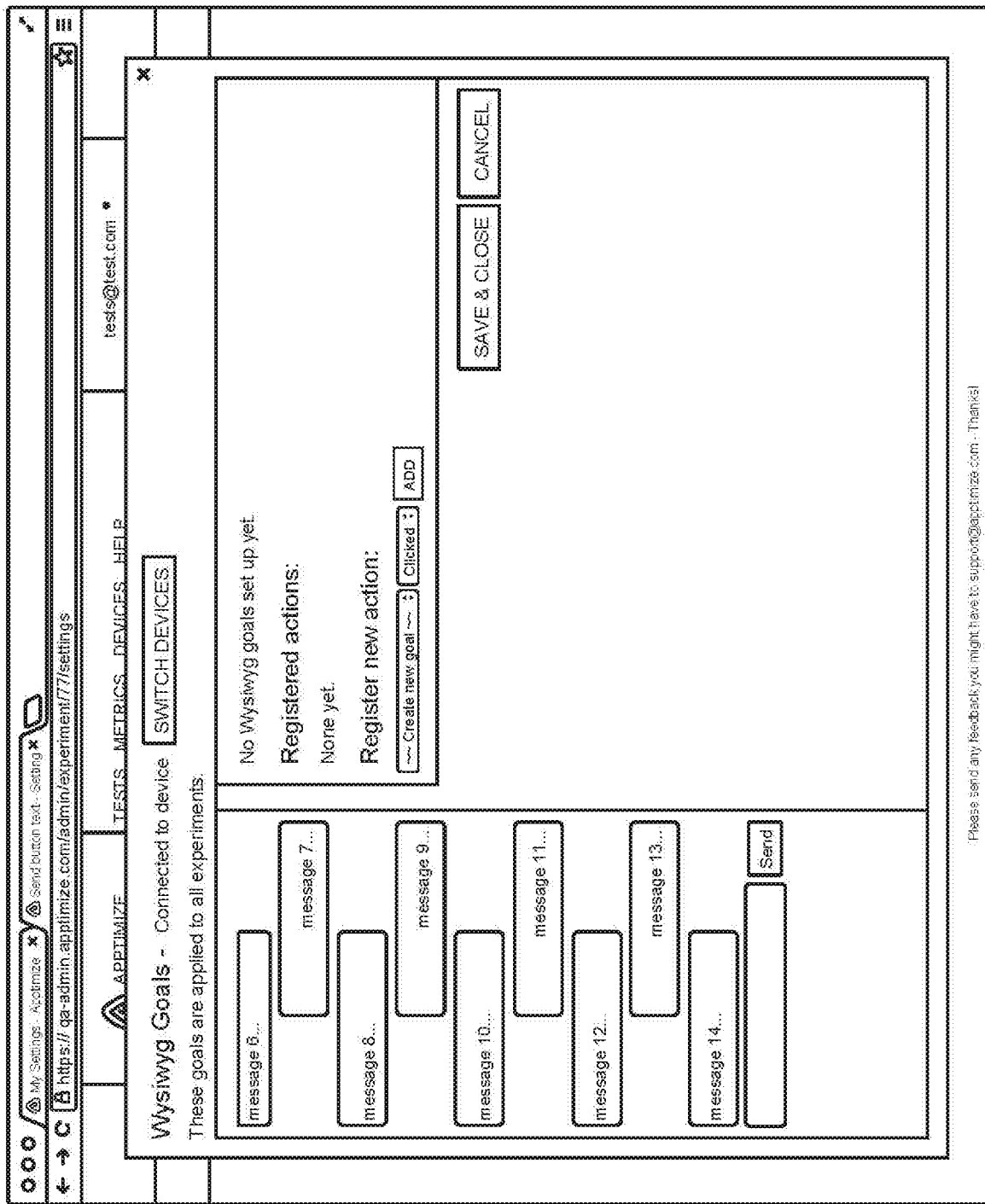
FIG. 15F is an illustrative drawing representing a developer system user interface screen display used to designate a first event related to the first change in the application user interface of a device in accordance with some embodiments.

FIG. 15D is an illustrative drawing showing a developer system fourth user interface screen produced in response to a developer user replacing the text, "Send", in the text property fields of each of the "disabled", "highlighted", "normal" and "selected" states with the text, "Ok". In this next screen example, the left-side screen indicates that in the "disabled", "highlighted", "normal" and "selected" states all have the text property, "Ok".

FIG. 15E is an illustrative drawing showing a developer system fifth user interface screen used to save the changes made by a developer to the application in accordance with some embodiments. This developer system user interface screen includes a field labeled "+ADD ANOTHER VARIATION" that can be selected to add a new row which allows the developer to name a variation and edit its styles, for example. This developer system user interface screen includes a field labeled "SET WYSIWYG GOALS" 'that can be selected to set tracking goals to track events related to the selected button.

FIG. 15F is an illustrative drawing showing a sixth developer user interface screen produced on a developer system used to register an event to track in relation to the selected button in accordance with some embodiments. A left side of the screen display shows the non-selected user interface elements, the chat bubbles and their text, greyed or dimmed so that the Send button shows as stands out as if highlighted. A track menu is provided to select an event tracking goal for a chosen user interface element, the Send button. Thus, the developer system user interface screens can be used both to designate changes to a chosen user interface and to designate events to track that are associated with the designated changes to the user interface element.

Thus, in this example, changes are specified to a particular control button of an application program user interface. The specified changes are stored in a computer readable storage device. The user interface control button corresponds to a view hierarchy that is used to generate the control button display in the application user interface. The view hierarchy corresponding to the control button, or at least a portion of it, that is used to generate the original control button is stored in association with the specified changes so that it can act as a selector used to determine when an instance of the application program running on a different device generates a matching view hierarchy so that the designated changes can be made to it prior to generation of the control button.

In addition, an event associated with the control button can be specified, and the selector can be stored in association with the event specification. The selector can be used to determine when an instance of the application program running on a different device generates a matching view hierarchy so that the modified control button can be monitored for user input that corresponds to the designated event.

First and second information structures 400 and 410 provide example details of specified modifications and corresponding selectors in accordance with some embodiments.

More particularly, a first information structure 400 shown in FIGS. 16A1-16A2 includes an indication 402 that identifies its name: "Send button text". It also provides an indication 404 of the hardware and software requirements of a device to which an application user interface change is to be applied. The first information structure 400 provides an indication 406 of changes to be made. In this example, the changes are to change the text property of the chosen application user interface button to "Ok" in each of the four button states: disabled, highlighted, normal and selected. The first information structure also provides a first selector 408 that includes constituents of the original view hierarchy used to generate the chosen user interface element of the application user interface. In this example, the chosen user interface element is the Select button, and the first selector 408 includes the constituents of the view hierarchy used to generate the "send" button in the application user interface. More specifically, the constituents include object classes and attributes within the view hierarchy and hierarchical relationships between them in the view hierarchy. Object classes within the first selector include: "UINavigationController", "UILayoutContainerView", "UILayoutContainerView", "UIViewControllerWrapperView", "UIParallaxDimmingView", "UIWindow" and "UIButton". Properties within the first selector include various "accessibilityKey" values and various "index", values, for example.

The second information structure 410 shown in FIGS. 16A1-16A2 includes an indication 412 that identifies an event type: "clicked". It also provides an indication 414 of the hardware and software requirements of a device to which an application user interface change is to be applied. The second information structure 410 provides a second selector 418 that includes constituents of the view hierarchy used to generate the user interface element of the application user interface that is to be tracked for the occurrence of events. In this example, the tracked application user interface element is the Select button, and the tracked event is the occurrence of "clicks" of that button. In this example the constituents of the second selector 418 are identical to the constituents of the first selector 408.

In accordance with some embodiments, the first information structure 400 is used to configure a user device to change the text displayed on the button from "Send" to "Ok", and the second information structure 410 is used to configure a user device to track the occurrence of click events involving the button having the substituted text, "Ok". It is noted that one use for the first and second information structures is for testing, and that the first information structure 400 includes the heading "experiments". In an experiment, for example, the first information structure 400 can be used to change the button text to "Ok", and the second information structure can be used to configure the device to track each application user click on the button labeled "Ok" and to transmit information to a monitoring system, which tracks the number of clicks. Gathering such information from a variety of user devices that generate the application user interface can help to provide a measure of the impact that labeling the button with the text "Ok" has upon frequency of user's clicking the button, for example.

Figure 17A:
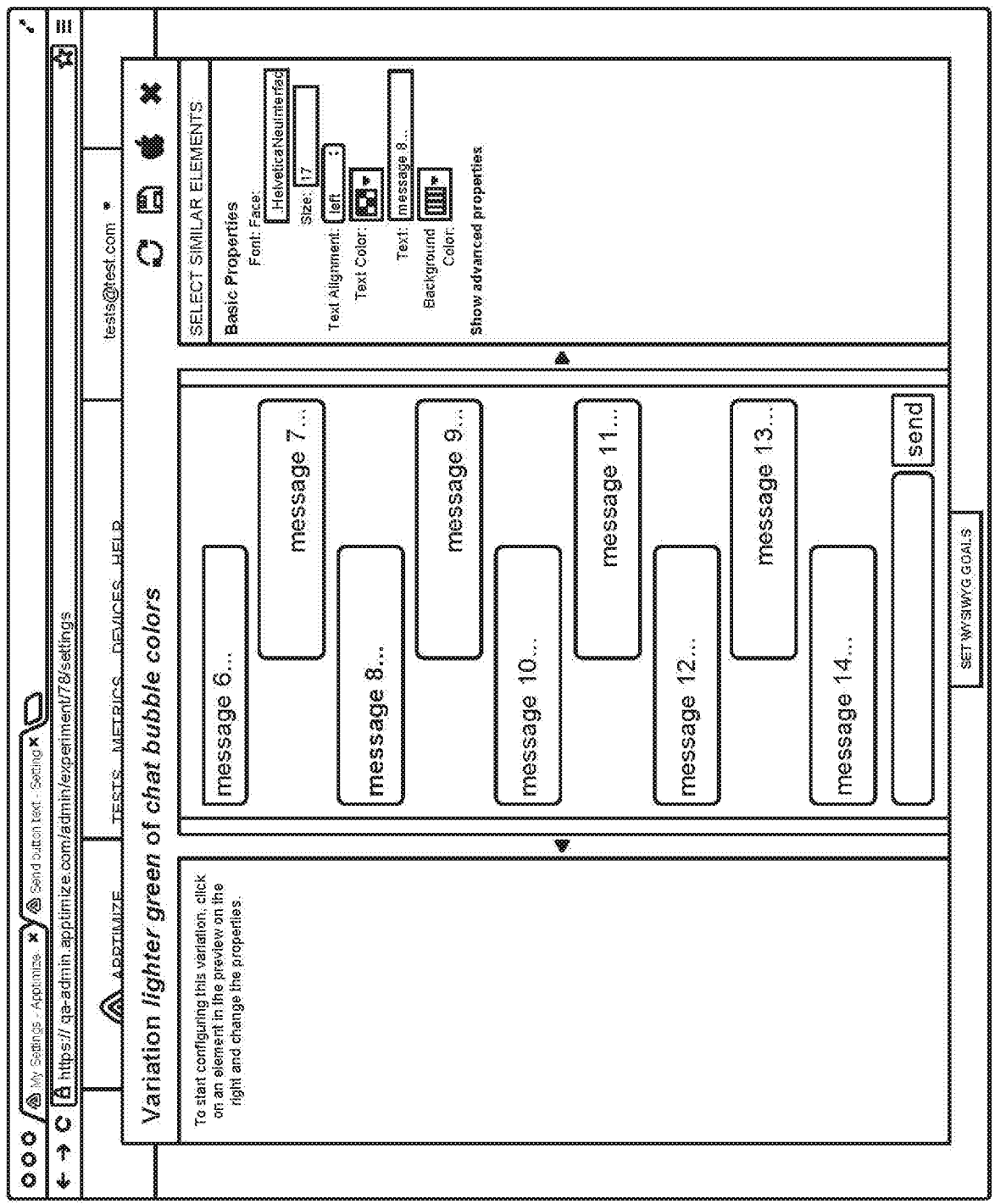
FIG. 17A is an illustrative drawing showing a seventh developer user interface screen display with three fields that is produced on a developer computer system in accordance with some embodiments.

Example 2—Details of Example User Interface and Information Structure Code Creation FIG. 17A is an illustrative drawing showing a seventh developer user interface screen display with three fields that is produced on a developer computer system. This example shows a center field that includes the same the application user interface of FIGS. 15A-15E, which includes an illustrative thread of message chat bubbles containing example text messages, message 6 to message 14 and the control button labeled "Send". In response to a developer's selection of the message 8 chat bubble, the center field shows the non-selected user interface elements, the other chat bubbles, their text and the Send button, greyed or dimmed so that the message 8 chat bubble shows or stands out as if highlighted. Also in response to the developer's selection of the message 8 chat bubble, the right column is changed to provide a property change menu display with a heading, "Basic Properties" and a menu of button property selectors that can be adjusted to change chat bubble properties, which in this example, are font face, text alignment, text color, text and background color. The property values shown in FIG. 17A are the properties of the selected the message 8 chat bubble as it exists in the application prior to entry of any changes by the developer user.

Figure 17B:
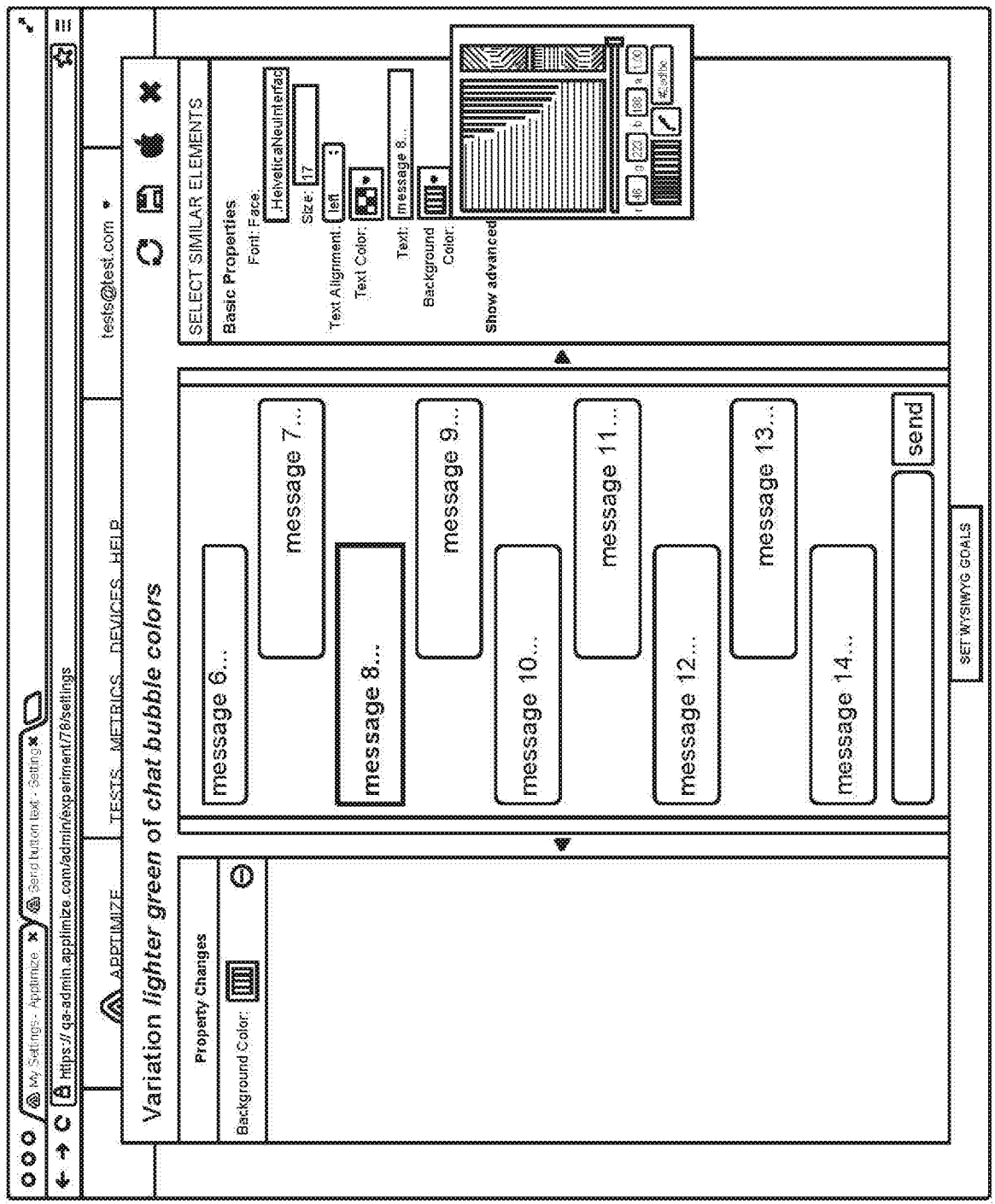
FIG. 17B is an illustrative drawing showing an eighth developer user interface screen produced in a developer system in response to a developer change in accordance with some embodiments.

FIG. 17B is an illustrative drawing showing an eighth developer user interface screen produced in a developer system in response to a developer changing the background color of the selected message 8 chat bubble. It can be seen that background color is changed using a pull-down menu that provides a UI control to change the relative Red, Green and Blue (RGB) color constituents. It can be seen that the background color of the message 8 chat bubble has been changed in response to the developer user color change input. It is noted that the left-side field indicates that a change in background color has been made.

Figure 17C:
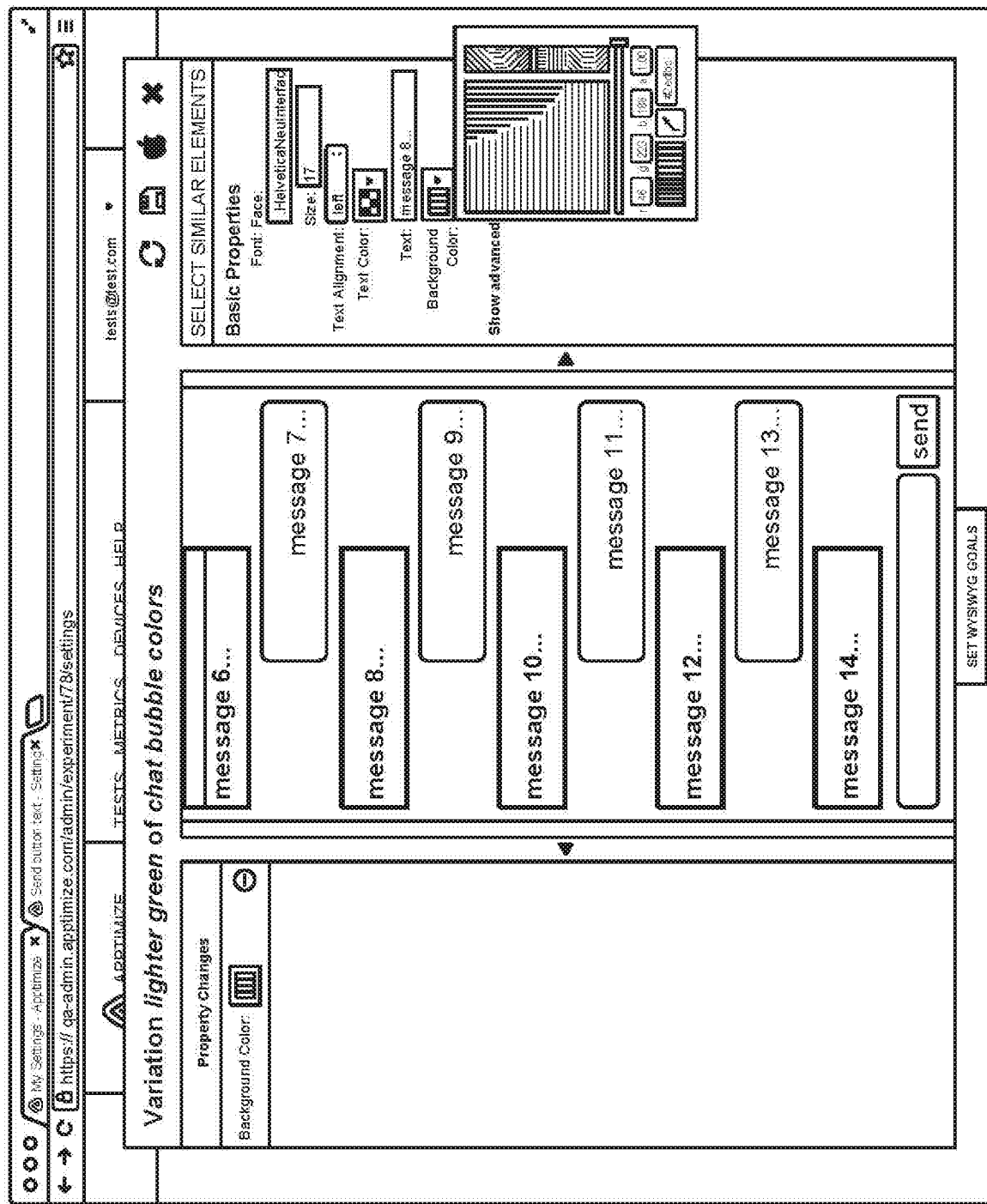
FIG. 17C is an illustrative drawing showing a ninth developer user interface screen produced in response to a developer actuating the control so as to apply a change to a wider range of user interface elements in accordance with some embodiments.

The property change menu of the eighth developer user interface screen in FIG. 17B includes a toggle button labeled "Select Similar Elements". A ninth user interface screen shown in FIG. 17C is produced in response to a developer actuating the toggle button so as to apply the change to a wider range of user interface elements. No other changes are made to the property change menu in the ninth screen. In response to actuation of the toggle button, the toggle button now is labeled "Select Single Element". Moreover, in response to actuation of the toggle button, all of the message chat bubbles on the left side of the chat thread now have their color changed to the color selected through the developer input provided in the eighth developer user interface screen shown in FIG. 17B. Furthermore, those left-side message chat bubbles are shown in highlight relative to the greyed out right side message chat bubbles.

As explained more fully below, the left side message chat bubbles are constituents of a larger view that contains a message 8 chat bubble view. The developer input provided in FIG. 17B has the effect of changing the background color of the single view encompassing message 8 chat bubble. As shown in FIG. 17C, however, toggling the toggle button has the effect of changing the background color of all of the left-side chat bubbles which are encompassed in the same larger view as the message 8 chat bubble. More specifically, the developer user input of FIG. 17B restricts the background color change to a single message chat element, and the developer input of FIG. 17C applies the same background color change to similar message chat elements. Even more specifically, the left-side message chat elements are produced using a table structure in a view hierarchy in which each chat element is implemented as a table cell, which is lower in the view hierarchy than the table structure that contains the cells. Changing the toggle state as between FIGS. 17B and 17C has the effect of removing a constraint upon application of the background color change to a single cell and causes the change to be applied instead to all similar cells in a table. In effect, the removal of the constraint upon application of the background color designates this constraint as a "don't care".

Figures 2, 19A:

Moreover, in accordance with some embodiments, changing the state of the toggle button has the effect of changing the structure of corresponding selectors. Referring to FIG. 18, a third selector is shown that corresponds to developer user input of the eighth developer screen of FIG. 17B and that includes constituent property values that constrain the change to one user input element, i.e. to the message 8 chat bubble. Referring to FIG. 19, a fourth selector is shown that corresponds to developer user input of the ninth developer screen of FIG. 17C and that omits constituent property values that would constrain the change to a single user input element, and as a result, the changed background color is applied to all left-side message chat bubbles. In other words, the fourth selector includes a "don't care" for the constraint upon application of the background color.

The third information structure 700 shown in FIG. 18 includes an indication 702 that identifies its name: "change one cell". It also provides an indication 704 of the hardware and software requirements of a device to which an application user interface change is to be applied. It is noted, that the example information structure uses a json format, as an example, which is hierarchical. For each variation, there is what is referred to as wysiwyg (what you see is what you get) data provided, and within the wysiwyg data, there are styles which are applied only if a device form factor and version number match. The third information structure 700 provides an indication 706 of changes to be made. In this example, the changes are to change the RGB background color. The third information structure also provides a selector 708 that includes constituents of a view hierarchy used to generate the chosen user interface element of the application user interface. In this example, the chosen user interface element is the message 8 chat bubble, and the selector 708 includes the constituents of the view hierarchy used to generate the message 8 chat bubble in the application user interface. More specifically, the constituents include object classes and attributes within the view hierarchy and hierarchical relationships between them in the view hierarchy. Object classes within the third selector include: "MainViewController", "UITableView", "SimpleTableItem2", "UITableViewCell", "UITableViewCellScrollView", "UITableViewCellContentView" and "UILabel", for example. Properties within the first selector include various "accessibilityKey", "row": 8 and "section": 0 and various "index", values, for example. Significantly, it is noted that the "SimpleTableItem2" class 710 includes properties "row": 8 712 and "section": 0 714.

The fourth information structure 800 shown in FIG. 19 includes an indication 802 that identifies its name: "chat bubble colors". It also provides an indication 804 of the hardware and software requirements of a device to which an application user interface change is to be applied. It is noted that in accordance with some embodiments, some modifications work on some platforms, but not all. For example, a change that works for a version of an application targeted for one type of smartphone device might not work for a type of different device such as a tablet computer, for example. Thus, in accordance with some embodiments selector constituents to be matched also may include device hardware and/or application software version, for example.

The fourth information structure 800 is identical to the third information structure except that its "SimpleTablatem2" class 810 does not include a properties "row" property or a "section" property. Consequently, the fourth information 800 structure provides fewer comparison constraints than the third information structure 700.

Thus, it will be appreciated that in connection with the FIG. 17C developer user interface example, not only is a specified change, i.e. a change in background color, stored, but also a view hierarchy used to generate the individual user interface element for which the change is specified is changed so that such changed view hierarchy matches view hierarchies of other user interface elements to which the change is to apply. More specifically, in this example, the view hierarchy used to generate the message 8 chat bubble is modified to remove constituents that limit it to a particular table cell. With the removal of the table cell constituents, the modified view hierarchy is no longer constrained to match only the table cell corresponding to the message 8 chat bubble, but also can match to the view hierarchies of other table cells also.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to track events associated with a user interface display of an application at runtime on a client device, the method comprising:
   storing one or more information structures that associate a view tracking indicator with a view selector, wherein the view tracking indicator can be used to track view usage, and the view selector indicates one or more constraints to be matched to select views of the application for tracking by the view tracking indicator, the views displayed in response to a user input trigger event;
   evaluating, in response to an occurrence of the user input trigger event during execution of the application, the view selector with one or more views to be displayed by the application based on the occurrence of the user input trigger event, the evaluating to determine whether each of the one or more constraints of the view selector matches properties of the one or more views; and
   configuring, in response to determining that each of the one or more constraints of the view selector matches the properties of at least one of the one or more views, the view tracking indicator to track usage of the view and to report the usage of the view to a server system.

2. The method of claim 1, wherein the user input trigger event comprises a user interaction with at least one user interface element of the view of the one or more views.

3. The method of claim 1, wherein the user input trigger event comprises a user interaction with at least one user interface element of the view of the application one or more views that was modified by a view modification indicator associated with an additional view selector, wherein the additional view selector indicates one or more constraints to be matched to select views of the application displayed in response to the user input trigger event for modification using the view tracking indicator.

4. The method of claim 3, wherein the view modification indicator associated with the additional view selector can be used to make one or more modifications to one or more of the views used by the application selected using the additional view selector.

5. The method of claim 1, wherein the one or more constraints of the view selector are loosened with at least one don't care constraint so that the view selector matches a wider range of the views used by the application.

6. The method of claim 1, wherein the one or more constraints of the view selector comprise visual property constraints and structural property constraints.

7. The method of claim 6, wherein the structural property constraints include layout properties.

8. One or more non-transitory computer-readable storage media having program instructions stored thereon to facilitate tracking events associated with a user interface display of an application at runtime on a client device, wherein the program instructions, when executed by a computing system, direct the computing system to at least:
   store one or more information structures that associate a view tracking indicator with a view selector, wherein the view tracking indicator can be used to track view usage, and the view selector indicates one or more constraints to be matched to select views of the application for tracking by the view tracking indicator, the views displayed in response to a user input trigger event;

evaluate, in response to an occurrence of the user input trigger event during execution of the application, the view selector with one or more views to be displayed by the application based on the occurrence of the user input trigger event, the evaluating to determine whether each of the one or more constraints of the view selector matches properties of the one or more views; and configure, in response to determining that each of the one or more constraints of the view selector matches the properties of at least one of the one or more views, track the view tracking indicator to track usage of the view and to report the usage of the view to a server system.

9. The one or more computer-readable storage media of claim 8, wherein the user input trigger event comprises a user interaction with at least one user interface element of the view of the one or more views.

10. The one or more computer-readable storage media of claim 8, wherein the user input trigger event comprises a user interaction with at least one user interface element of the view of the one or more views that was modified by a view modification indicator associated with an additional view selector, wherein the additional view selector indicates one or more constraints to be matched to select views of the application displayed in response to the user input trigger event for modification using the view tracking indicator.

11. The one or more computer-readable storage media of claim 10, wherein the view modification indicator associated with the additional view selector can be used to make one or more modifications to one or more of the views used by the application selected using the additional view selector.

12. The one or more computer-readable storage media of claim 8, wherein the one or more constraints of the view selector are loosened with at least one don't care constraint so that the view selector matches a wider range of the views used by the application.

13. The one or more computer-readable storage media of claim 8, wherein the one or more constraints of the view selector comprise visual property constraints and structural property constraints.

14. The one or more computer-readable storage media of claim 13, wherein the structural property constraints include layout properties.

15. A computing apparatus comprising:
one or more non-transitory computer-readable storage media;
a processing system of a client device operatively coupled with the one or more non-transitory computer readable storage media; and
an application stored on the one or more computer-readable storage media comprising program instructions to facilitate tracking events associated with a user interface display of the application at runtime on the client device, wherein the program instructions, when executed by the processing system, direct the processing system to at least:

store one or more information structures that associate a view tracking indicator with a view selector, wherein the view tracking indicator can be used to track view usage, and the view selector indicates one or more constraints to be matched to select views of the application for tracking using the view tracking indicator, the views displayed in response to a user input trigger event;

evaluate, in response to an occurrence of the user input trigger event during execution of the application, the view selector with one or more views to be displayed by the application based on the occurrence of the user input trigger event, the evaluating to determine whether each of the one or more constraints of the view selector matches properties of the one or more views; and configure, in response to determining that each of the one or more constraints of the view selector matches the properties of at least one of the one or more views, track the view tracking indicator to track usage of the view and to report the usage of the view to a server system.

16. The computing apparatus of claim 15, wherein the user input trigger event comprises a user interaction with at least one user interface element of the view of the one or more views.

17. The computing apparatus of claim 15, wherein the user input trigger event comprises a user interaction with at least one user interface element of the view of the one or more views that was modified by a view modification indicator associated with an additional view selector, wherein the additional view selector indicates one or more constraints to be matched to select views of the application displayed in response to the user input trigger event for modification using the view tracking indicator.

18. The computing apparatus of claim 17, wherein the view modification indicator associated with the additional view selector can be used to make one or more modifications to one or more of the views used by the application selected using the additional view selector.

19. The computing apparatus of claim 15, wherein the one or more constraints of the view selector are loosened with at least one don't care constraint so that the view selector matches a wider range of the views used by the application.

20. The computing apparatus of claim 15, wherein the one or more constraints of the view selector comprise visual property constraints and structural property constraints.

* * * * *